(12) United States Patent
He et al.

(10) Patent No.: US 12,414,144 B2
(45) Date of Patent: Sep. 9, 2025

(54) TECHNOLOGIES IN MULTI-PDSCH TRANSMISSION IN A WIRELESS NETWORK

(71) Applicant: Apple Inc., Cupertino, CA (US)

(72) Inventors: Hong He, San Jose, CA (US); Chunxuan Ye, San Diego, CA (US); Dawei Zhang, Saratoga, CA (US); Haitong Sun, Cupertino, CA (US); Huaning Niu, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 452 days.

(21) Appl. No.: 17/947,847

(22) Filed: Sep. 19, 2022

(65) Prior Publication Data
US 2023/0140658 A1 May 4, 2023

Related U.S. Application Data

(60) Provisional application No. 63/275,834, filed on Nov. 4, 2021.

(51) Int. Cl.
*H04W 4/00* (2018.01)
*H04B 17/318* (2015.01)
(Continued)

(52) U.S. Cl.
CPC ........ *H04W 72/542* (2023.01); *H04B 17/318* (2015.01); *H04L 5/0051* (2013.01);
(Continued)

(58) Field of Classification Search
None
See application file for complete search history.

(56) References Cited

U.S. PATENT DOCUMENTS 11,864,238 B2 * 1/2024 Zewail ............... H04W 74/002
2020/0153543 A1 5/2020 Khoshnevisan et al.
(Continued)

FOREIGN PATENT DOCUMENTS

| EP | 3972356 | 3/2022 | |
|---|---|---|---|
| WO | WO 2020230864 | 11/2020 | |
| WO | WO-2023055838 A1 * | 4/2023 | ........... H04B 7/2656 |

OTHER PUBLICATIONS

[Unknown Author], "3rd Generation Partnership Project; Technical Specification Group Radio Access Network; NR; Multiplexing and channel coding (Release 16)," 3GPP TS 38.212 V16.7.0, Sep. 2021, 153 pages.
(Continued)

*Primary Examiner* — Zewdu A Beyen
(74) *Attorney, Agent, or Firm* — Fish & Richardson P.C.

(57) ABSTRACT

In an example method, a user equipment (UE) device receives a plurality of Synchronization Signal Block (SSB) beams transmitted by base stations (BSes) during discovery burst transmission windows (DBTWs). For each of the SSB beams, the UE device determines an index value of the SSB beam ($l_{SSB}$) within a respective one of the DBTWs, and determines a value $Z=l_{SSB} \bmod N_{SSD}^{QCL}$, where $N_{SSB}^{QCL}$ represents a maximum allowable number of SSB beams transmitted by each of the BSes during a single DBTW. The UE device determines whether two or more of the SSB beams are quasi co-located based on the values Z for the SSB beams, and processes wireless signals received from the BSes based on the determination.

18 Claims, 25 Drawing Sheets

(51) Int. Cl.
  *H04L 5/00* (2006.01)
  *H04W 56/00* (2009.01)
  *H04W 72/0446* (2023.01)
  *H04W 72/1273* (2023.01)
  *H04W 72/23* (2023.01)
  *H04W 72/542* (2023.01)
  *H04L 27/26* (2006.01)

(52) U.S. Cl.
  CPC ......... *H04L 5/0053* (2013.01); *H04W 56/001* (2013.01); *H04W 72/0446* (2013.01); *H04W 72/1273* (2013.01); *H04W 72/23* (2023.01); *H04L 27/2602* (2013.01)

(56) References Cited

U.S. PATENT DOCUMENTS

| | | |
|---|---|---|
| 2020/0337058 A1 | 10/2020 | Song et al. |
| 2021/0084623 A1 | 3/2021 | Zhang et al. |
| 2022/0116859 A1 | 4/2022 | Park et al. |
| 2022/0150851 A1 | 5/2022 | Tian et al. |
| 2023/0117182 A1 | 4/2023 | Xue et al. |
| 2023/0139563 A1 | 5/2023 | He et al. |
| 2023/0140729 A1 | 5/2023 | He et al. |
| 2023/0189011 A1* | 6/2023 | Si .................. H04W 52/146 370/329 |
| 2023/0371039 A1 | 11/2023 | Tsai et al. |

OTHER PUBLICATIONS

[Unknown Author], "3rd Generation Partnership Project; Technical Specification Group Radio Access Network; NR; Physical layer procedures for control (Release 16)," 3GPP TS 38.213 V16.7.0, Sep. 2021, 188 pages.

[Unknown Author], "3rd Generation Partnership Project; Technical Specification Group Radio Access Network; NR; Physical layer procedures for data (Release 16)," 3GPP TS 38.214 V16.7.0, Sep. 2021, 172 pages.

Catt, "On QCL for NR," 3GPP TSG RAN WG1 Meeting NR#3, R1-1715810, Nagoya, Japan, Sep. 18-21, 2017, 9 pages.

Interdigital et al., "Discussions on initial access aspects," 3GPP TSG RAN WG1 #105e, R1-2105581, May 19-27, 2021, 13 pages.

* cited by examiner

1214

1214a
Receive, by a user equipment (UE) device, a slot of data transmitted by the transmitted by a base station (BS), where the slot of data includes a sequence of symbols, and where the slot of data includes:
(i) a first Synchronization Signal Block (SSB) including a first subset of the symbol, and
(ii) a second SSB subsequent to the first SSB, the second SSB including a second subset of the symbols

1214b
Determine, by the UE device, a quality of a wireless channel between the BS to the UE device, where determining the quality of the wireless channel includes at least one of:
(i) determining a first quality metric for a first interval extending from a sequentially first symbol of the slot of data to a symbol immediately preceding the first subset of symbols,
(ii) determining a second quality metric for a second interval extending from the sequentially first symbol of the slot of data to a sequentially last symbol of the first subset of symbols,
(iii) determining a third quality metric for a third interval extending from the sequentially first symbol of the slot of data to a symbol immediately preceding the second subset of symbols, or
(iv) determining a fourth quality metric for a fourth interval extending from the sequentially first symbol of the slot of data to a sequentially last symbol of the second subset of symbols

1214c
Transmit, by the UE device, an indication of the quality of the wireless channel to the BS

FIG. 12H

TECHNOLOGIES IN MULTI-PDSCH TRANSMISSION IN A WIRELESS NETWORK

CROSS-REFERENCE TO RELATED APPLICATIONS

This application claims priority to U.S. Application No. 63/275,834, filed on Nov. 4, 2021, which is hereby incorporated by reference in its entirety.

TECHNICAL FIELD

The disclosure relates to technologies in multi-PDSCH transmission in a wireless network, such as, but not limited to, systems and techniques for determining quasi co-location.

BACKGROUND

Wireless systems typically include multiple User Equipment (UE) devices communicatively coupled to one or more Base Stations (BSes). The one or more BSes may be Long Term Evolved (LTE) evolved NodeBs (eNB) or new radio (NR) NodeBs (gNB) or next generation node Bs (gNB) that can be communicatively coupled to one or more UEs by a cellular network that may be associated with 3GPP standardizations.

SUMMARY

Systems, methods, devices and non-transitory, computer-readable media are disclosed for determining quasi co-location for multi-PDSCH transmissions in a wireless network.

Particular implementations provide at least the following advantages. In some cases, the implementations described herein can be used to exchange data between electronic device in a power efficient and network resource efficient manner. As an example, a user equipment (UE) device can determine that two or more antenna ports of a base station are quasi co-located with one another, and determine that wireless signals propagating from those antenna ports to the UE have similar large scale properties (e.g., average delay, delay spread, Doppler shift, Doppler spread, and average gain). Based on this determination, the UE device can process wireless signals in a similar manner (e.g., decode information from the wireless signals based on similar assumptions for regarding the large scale properties of those wireless signals), without individually determining the large scale properties of each and every wireless signal separately. Accordingly, the UE device can process wireless signals quickly and efficiently The details of one or more embodiments are set forth in the accompanying drawings and the description below. Other features and advantages will be apparent from the description and drawings, and from the claims.

DESCRIPTION OF DRAWINGS

FIGS. 12A-12H are flow chart diagrams of example processes performed by one or more devices of a wireless network.

DETAILED DESCRIPTION

Figure 1A:
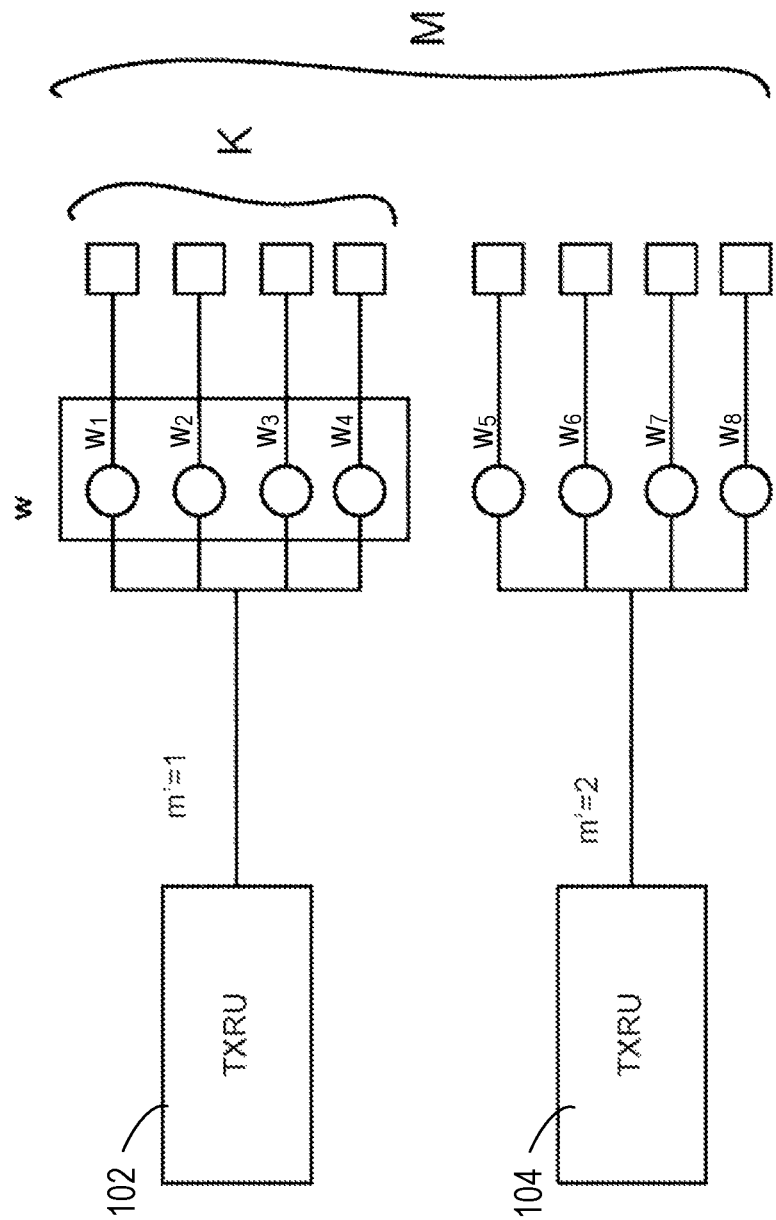
FIG. 1A is a diagram of an example sub-array antenna architecture.

In general, two antenna ports can be quasi co-located if the large-scale properties of the channel over which a symbol on one antenna port is conveyed can be inferred from the large-scale properties of the channel over which a symbol on the other antenna port is conveyed. The large-scale properties of the channel can include one or more of: average delay, delay spread, Doppler shift, Doppler spread, and average gain.

Various quasi co-location assumptions can be supported in order to enable more efficient processing at a user equipment (UE) device. In one example, the antenna port of a synchronization signal block (SSB) can be quasi co-located with the antenna port of another SSB. As another example, one example, the antenna port of a Physical Downlink Shared Channel (PDSCH) can be quasi co-located with the antenna port of another PDSCH. This disclosure describes various techniques can be used to determine a QCL between two or more antenna ports, such that communications can be processed more quickly and/or efficiently on a wireless network.

In general, an antenna port can be used for transmission of a physical channel or signal. The antenna port can be defined so that the channel over which a symbol on the antenna port is conveyed can be inferred from the channel over which another symbol on the same antenna port is conveyed. Different antenna ports can correspond to different reference signals, which can be used for channel estimation and processing of the physical channel transmitted on the same antenna ports. Antenna ports that correspond to different reference signals may be located at the same location, or different locations. Each channel of a signal from differently located antenna ports can have substantially different large scale properties due to the different location, different distance from a UE, different signal paths, and so forth. However, antenna ports that are located at different locations may still have similar large scale properties if the distance between the ports is not substantial. These antenna ports can be assumed to have the same large scale properties, and may be referred to as being quasi co-located. Two antenna ports can be quasi co-located if the large-scale properties of the channel over which a symbol on one antenna port is conveyed can be inferred from the large-scale properties of the channel over which a symbol on the other antenna port is conveyed.

The large-scale properties of the channel can include one or more of: average delay, delay spread, Doppler shift, Doppler spread, and average gain. The average delay can include the first-order statistics for the time property of a channel. The delay spread can include the second-order statistics for the time property of the channel. The Doppler shift can include the first-order statistics for the frequency properties of a channel. The Doppler spread can include the second-order statistics for the frequency properties of a channel. The average gain can include the first-order statistics for the amplitude properties of the channel. The large-scale properties estimated on antenna ports of reference signals can be used to parametrize the channel estimator and compensate for possible time and frequency errors when deriving channel state information (CSI) feedback or when performing demodulation.

New Radio (NR) antenna design is primarily based on the antenna sub-array concept. According to this concept, the physical antenna elements of the transmission receive point (TRP) (e.g. a next generation node B (gNB)) or user equipment (UE) can be grouped into antenna sub-arrays in which each antenna array can include multiple sub-arrays. Also, the physical antenna elements of the antenna sub-array can be virtualized to the one or more antenna ports using analog beamforming.

The analog beamforming can be used to improve the performance of the communication link between the TRP and the UE. The analog beamforming at the TRP and the UE can be trained by transmitting a series of the reference signals with different beamforming. The UE can also train the receive beamforming. The optimal analog beamforming at the UE can depend on the beamforming at the TRP, and the optimal analog beamforming at the TRP can depend on the beamforming at the UE. One or more optimal transmission (Tx)/reception (Rx) beam combinations at the TRP and the UE can be established for possible communication. In one example, an optimal Tx beam on one antenna subarray can be reused on another antenna subarray. In this example, the optimal Rx beam at the UE can be the same. The reference signals transmitted on an antenna port with the same beam, using the same or different panels, can be quasi co-located with each other with respect to the spatial channel parameters (e.g., mean angle of arrival and angle of arrival spread).

As an example, as shown in FIG. 1A, a sub-array antenna architecture can have two sub-arrays in which each sub-array can have different analog beamforming. In this example, a transceiver unit (TXRU) 102 can include K antenna elements, where K is a positive integer (e.g., 4). Each of the K antenna elements can include an antenna weight w (e.g., $w_1$, $w_2$, $w_3$, and $w_4$). The analog beamforming can be controlled by the antenna weights w (e.g., $w_1$, $w_2$, $w_3$, and $w_4$ for the m'=1 sub-array. In this example, a TXRU 104 can include K antenna elements, where K is a positive integer (e.g., 4). Each of the K antenna elements can include an antenna weight w (e.g., $w_5$, $w_6$, $w_7$, and $w_8$). The analog beamforming can be controlled by the antenna weights (e.g., $w_5$, $w_6$, $w_7$, and $w_8$) for the m'=2 sub-array. The K antenna elements in the TXRU 102 and TXRU 104 can include a total of M antenna elements (e.g., 8). The example shown in FIG. 1A is not intended to be limiting. The total number of antenna elements can depend on system design. For example, M can be 4, 8, 16, 32, 48, 64, 96, 128 and so forth. A larger number of antenna elements can provide beams that can be directed with a finer angular granularity.

Figure 1B:
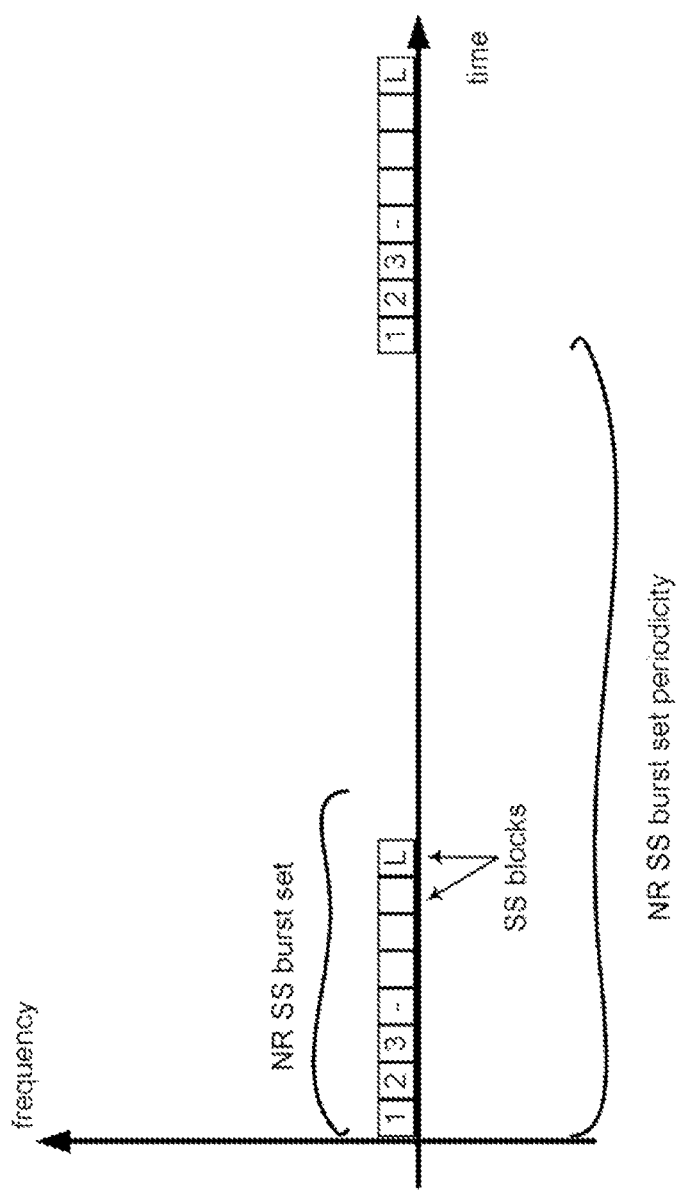
FIG. 1B is a diagram of an example synchronization signal (SS) transmission.

Synchronization signals (SSs) in NR can be transmitted using one or more synchronization signal blocks (SSBs) organized into SS burst sets. For example, as shown in FIG. 1B, a SS burst set can include SSBs 1, 2, 3, . . . , L, where L is a positive integer. In the time domain, the SS burst set can have a SS burst set periodicity, which can be the period between iterations of the SS burst set.

Figure 1C:
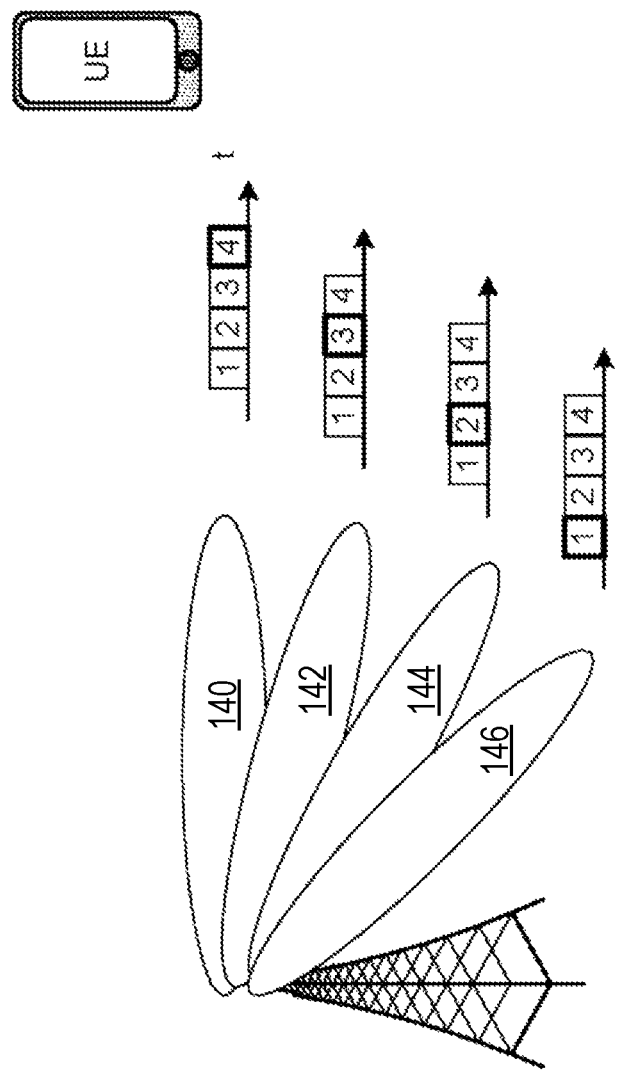
FIG. 1C is a diagram of an example beam assignment for different synchronization signal (SS) blocks.

One of the purposes of transmitting multiple SSBs can be to enable Tx beamforming for each individual SSB transmitted by the next generation node B (gNB). As an example, as shown in FIG. 1C, each SSB can be assigned to a specific beam. In this example, SSB 1 can be assigned to a beam 140, SSB 2 can be assigned to a beam 142, SSB 3 can be assigned to a beam 144, and SSB 4 can be assigned to a beam 146. Upon detection of the specific SSBs (e.g., during one or more discovery burst transmission windows (DBTWs), the UE can acquire Tx/Rx beam information that can be used for transmission of the other physical channels and reference signals.

In some implementations, a BS can define multiple candidate positions for SSBs within a radio frame (e.g., corresponding to the number of beams radiating in a certain direction). The UE can measure the signal strength of each SSB that it detects during a particular interval of time (e.g., one or more DBTWs), identify the SSB having the strongest signal strength, and select the corresponding beam for use in exchanging data with the BS.

Figure 2:
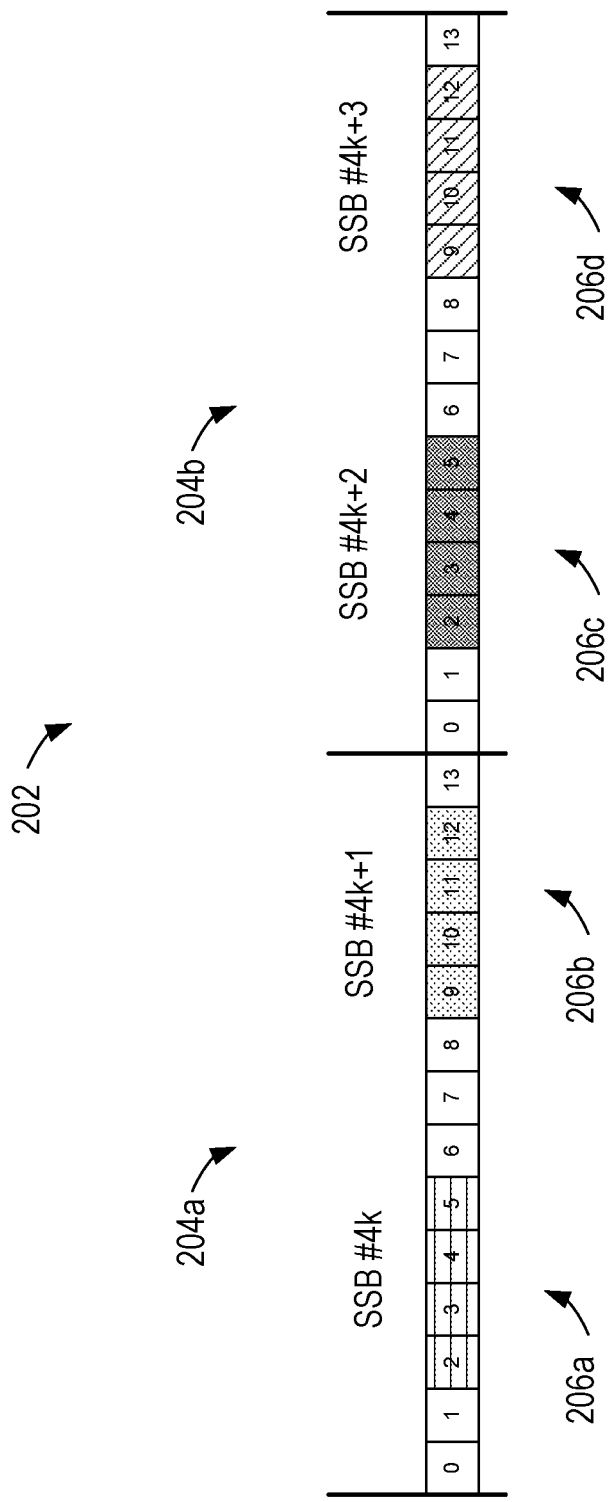
FIG. 2 is a diagram of an example SSB pattern.

An example SSB pattern 200 is shown in FIG. 2. In this example, up to four SSBs can be transmitted by the BS during a frame 202. In particular, the frame 202 is divided into two half frames 204a and 204b, each having 14 respective slots (e.g., having index values 0 to 13). A first SSB 206a can be transmitted during the first half frame 204a, with the first symbol of the first SSB 206a being transmitted during the slot 2, and having a length of four symbols (e.g., corresponding to slots 2-5). A second SSB 206b also can be transmitted during the first half frame 204a, with the first symbol of the second SSB 206b being transmitted during the slot 9, and having a length of four symbols (e.g., corresponding to slots 9-12). Further, a third SSB 206c can be transmitted during the second half frame 204b, with the first symbol of the second SSB 206c being transmitted during the slot 2, and having a length of four symbols (e.g., corresponding to slots 2-5). Further, a fourth SSB 206d also can be transmitted during the second half frame 204d, with the first symbol of the fourth SSB 206d being transmitted during the slot 9, and having a length of four symbols (e.g., corresponding to slots 9-12).

In some implementations, the SSB pattern 200 can be used in connection with network configurations having a 480 kHz and/or 960 kHz Subcarrier Spacing (SCS), for the Frequency Range 2_2 (FR2_2).

In some implementations, a UE can receive multiple candidate SSBs transmitted by one or more BSes during a particular time interval (e.g., a single DBTW, or across multiple DBTWs), and determine whether those SSBs are quasi co-located. If so, the UE can determine the large-scale properties associated with one of quasi co-located SSBs (e.g., average delay, delay spread, Doppler shift, Doppler spread, average gain, etc.), and apply the same large-scale properties to processing the other quasi co-located SSBs.

In some implementations, a UE can determine whether SSBs are quasi co-located based on the relationship:

$$Z = l_{SSB} \bmod N_{SSB}^{QCL} \quad \text{(Eq.1)},$$

where $l_{SSB}$ is the index value of the candidate SSB within a DBTW, and $N_{SSB}^{QCL}$ represents a maximum allowable number of SSBs (e.g., physical beams) that can be transmitted by each of the BSes during a single DBTW. In some implementations, the value for $N_{SSB}^{QCL}$ can be pre-determined (e.g., by an administrator of the wireless network), and provided to the UE (e.g., indicated in a Master Information Block transmitted from one or more of the BSes to the UE).

Figure 3:
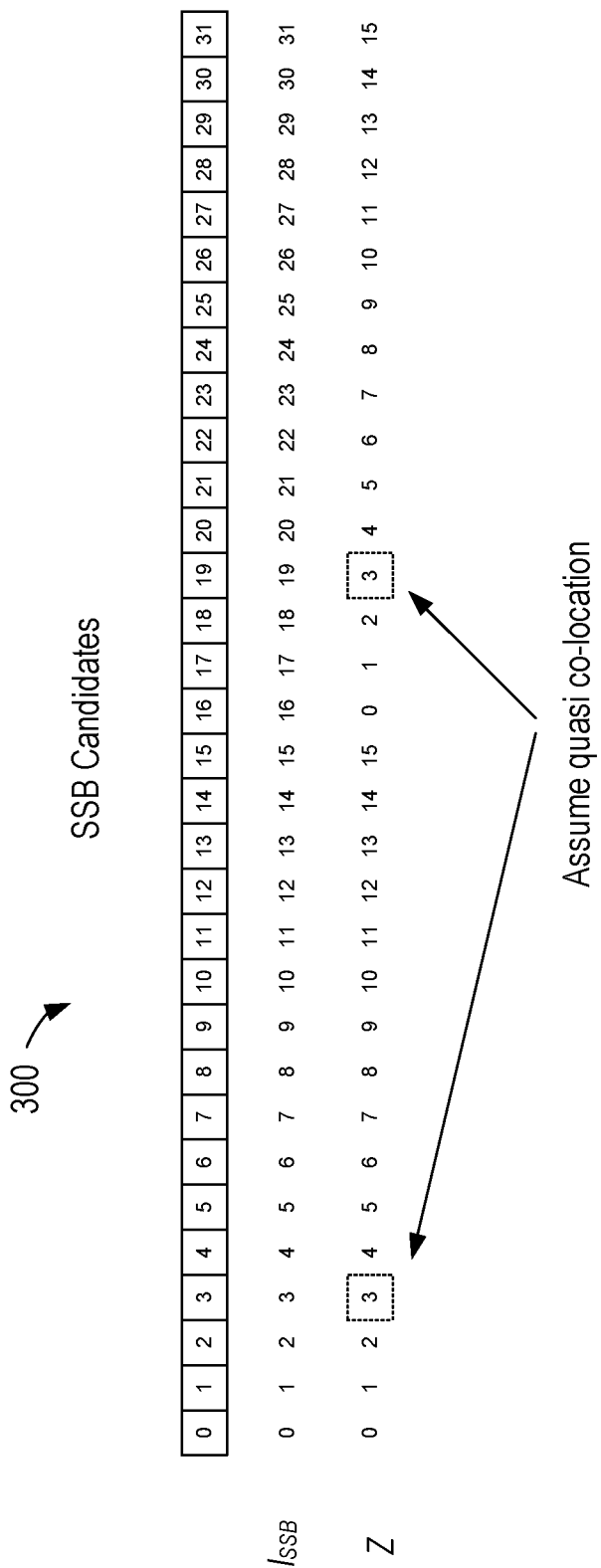
FIG. 3 is a diagram of example SSB candidates in a discovery burst transmission window (DBTW).

In particular, for each SSB, the UE can calculate the value Z of that SSB, and assume that SSBs having the same value Z are quasi co-located. As an example, FIG. 3 shows an example 300 of 32 SSB candidates during a single DBTW, having corresponding index values ($l_{SSB}$) 0 to 31, respectively. Further, in this example, $N_{SSB}^{QCL}$ is equal to 16 (e.g., a BS can transmit up to 16 physical beams during a DBTW). Here, the SSB candidates having index values 3 and 19 each have the value of 3 for Z in accordance with $Z = l_{SSB} \bmod N_{SSB}^{QCL}$. Accordingly, the UE can assume that these SSBs are quasi co-located, and process the SSBs accordingly.

Figure 4:
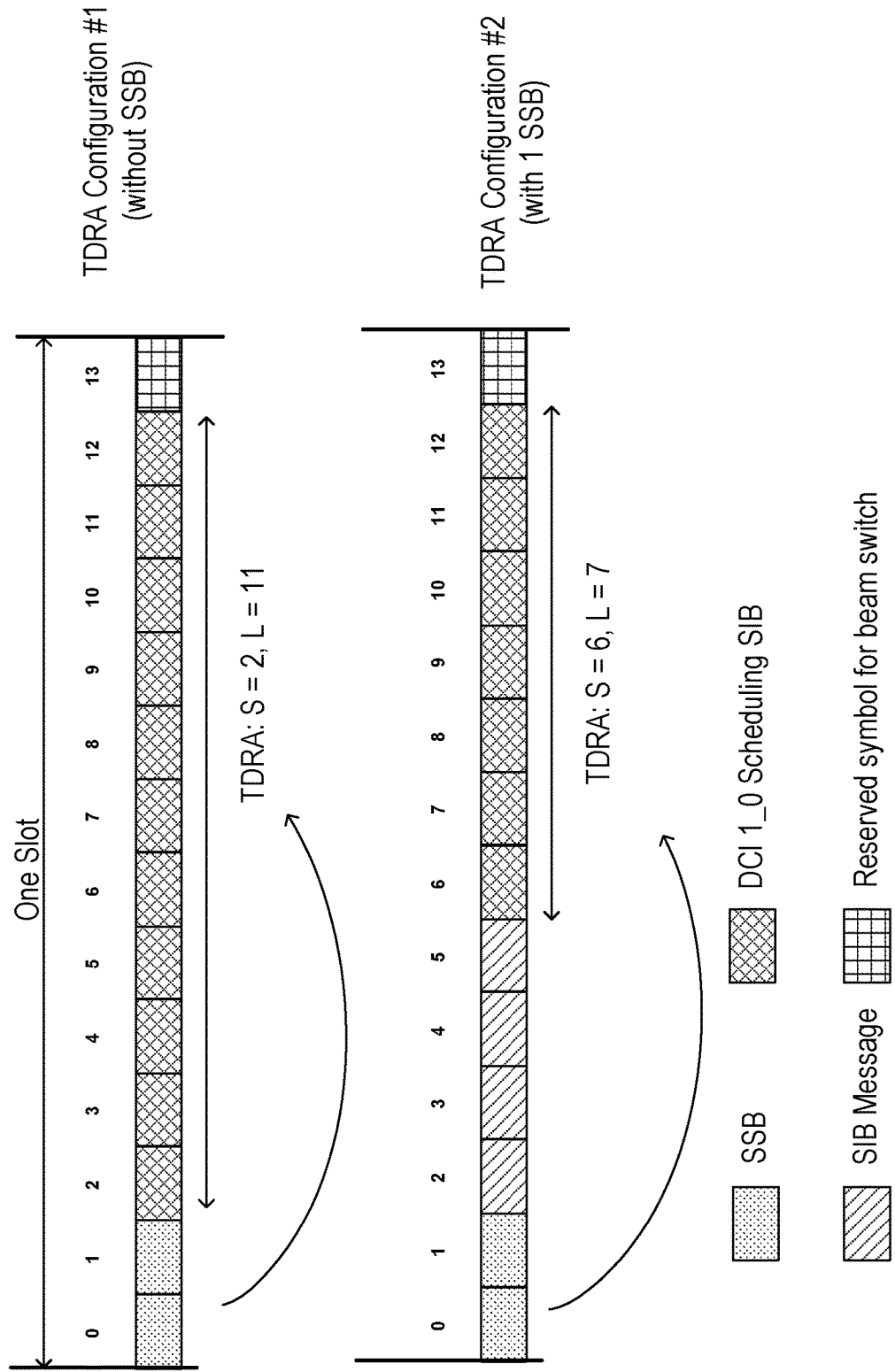
FIG. 4 is a diagram of example Time Domain Resource Allocation (TDRA) configurations.

In some implementations (e.g., in 5G NR), a System Information Block (SIB) messages can carry information relevant when evaluating if a UE is allowed to access a cell and defines the scheduling of other system information. In some implementations, SIB messages can be transmitted over a number of consecutive symbols according to the value of Time Domain Resource Allocation (TDRA) field of the scheduling DCI which indicates one of TDRA configurations shown in FIG. 4. These TDRA configurations may be particularly suitable for network configurations having a 480 kHz and/or 960 kHz SCS.

For example, in a first configuration, a PDSCH can be transmitted in a slot having 14 symbols (e.g., having index values 0 to 13), including Downlink Control Information (DCI) (e.g., DCI 1_0 scheduling SIB) spanning symbols 0 and 1, a SIB message spanning symbols 2 to 12, and a reserved symbol for indicating a beam switch at the symbol 13.

As another example, in a second configuration, a PDSCH can be transmitted in a slot having 14 symbols (e.g., having index values 0 to 13), including Downlink Control Information (DCI) (e.g., DCI 1_0 scheduling SIB) spanning symbols 0 and 1, a SSB spanning symbols 2 to 5, a SIB message spanning symbols 6 to 12, and a reserved symbol for indicating a beam switch at the symbol 13.

These configurations are summarized in the following table:

TABLE 1

Example TDRA configurations.

| Row Index (TDRA Configuration) | Drms-TypeA-Position | PDSCH Mapping Type | K0 | S | L |
|---|---|---|---|---|---|
| 1 | 2 | Type A | 0 | 2 | 11 |
| 2 | — | Type B | 0 | 6 | 17 |

In Table 1, S refers to the index of the first symbol of the SIB message within a slot, L refers to the number of consecutive symbol symbols of the SIB message counting from the starting symbol 'S', and K0 refers to the slot offset between the downlink slot where downlink scheduling is received (e.g., a Physical Downlink Control Channel (PDCCH) containing a DCI) and the downlink slot where PDSCH data is scheduled.

In some implementations, a wireless network can be configured according to a parameter timeDurationForQCL, which refers to a minimum time between (i) the reception of sequentially last symbol of a Downlink Control Information (DCI) that schedules the transmission of one or more PDSCHs from a BS to a UE, and (ii) an application of QCL information included in the DCI for processing PDSCHs. For example, PDSCHs that are received subsequent to the timeDurationForQCL can be processed using QCL information included in the DCI. For example, Downlink (DL) Reference Signals of these PDSCHs can be processed based on a common set of large scale parameters indicated by the QCL information). However, PDSCHs that are received prior to the timeDurationForQCL cannot be processed using QCL information included in the DCI.

Figure 5:
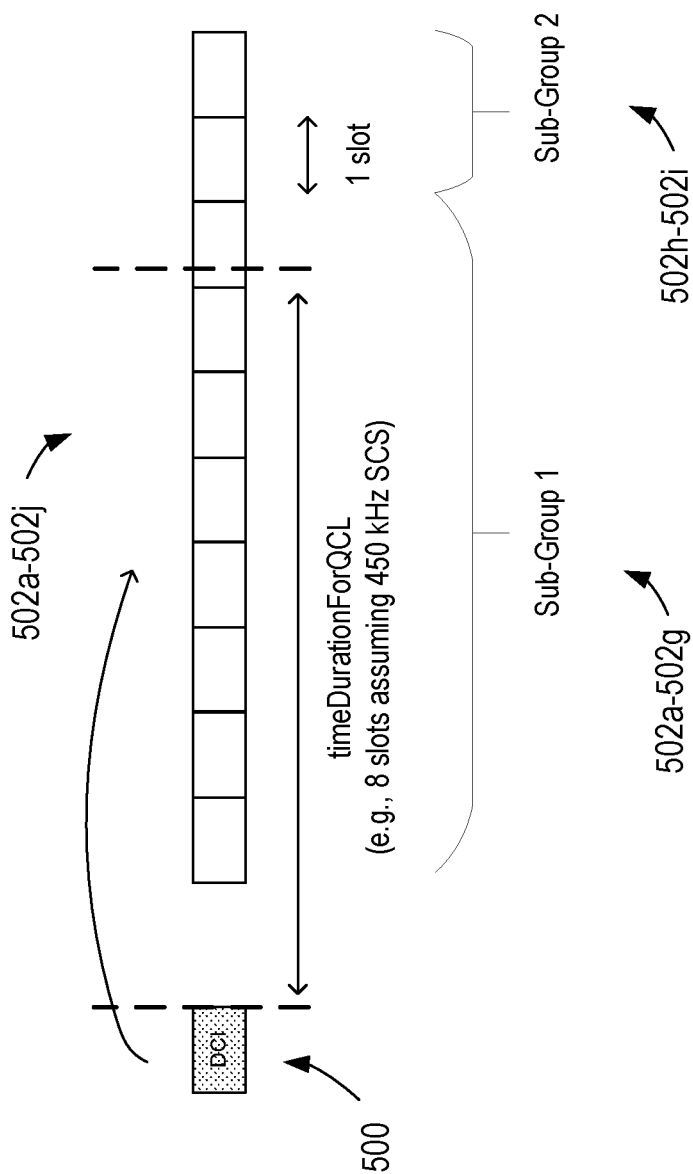
FIG. 5 is a diagram of an example DCI and multiple Physical Downlink Shared Channel (PDSCHs) scheduled by the DCI.

As an example, FIG. 5 shows an example DCI 500 including scheduling information for a transmission of ten PDSCHs 502a-502j from a UE to a BS across ten corresponding slots. Further, the UE and BS are configured such that timeDurationForQCL corresponds to a time duration spanning eight slots from the end of the DCI (e.g., the sequentially last symbol of the DCI). The PDSCHs in Sub-Group 2 (e.g., PDSCHs 502h and 502i) begin after the threshold timeDurationForQCL, and can be processed by the UE according to QCL information contained within the DCI 500. For example, DL RSes of these PDSCHs can be processed based on a common set of large scale parameters indicated by the QCL information in the DCI 500. However, the PDSCHs in Sub-Group 1 (e.g., PDSCHs 502a-502g) fall at least partially before the threshold timeDurationForQCL. Accordingly, the UE cannot apply the QCL information included in the DCI 500 when processing the PDSCHs in Sub-Group 1.

Although FIG. 5 shows a timeDurationForQCL corresponding to 8 slots, in practice, the value of timeDurationForQCL can vary. For example, for a network configuration having a 120 kHz SCS, timeDurationForQCL can be equal to 14 or 28 symbols (e.g., 1 or 2 slots). As another example, for a network configuration having a 480 kHz SCS, timeDurationForQCL can be a great as 112 symbols (e.g., up to 8 slots). As another example, for a network configuration having a 960 kHz SCS, timeDurationForQCL can be as great as 224 symbols (e.g., up to 16 slots).

In some implementations, a UE can apply a single QCL assumption for all of the scheduled PDSCHs (e.g., both the PDSCHs in Sub-Group 1 and Sub-Group 2), regardless of the value of timeDurationForQCL. For example, a UE can determine a single set of large-scale properties for a channel (e.g., average delay, delay spread, Doppler shift, Doppler spread, average gain, etc.), and process the PDSCHs (e.g., the DL RSes of the PDSCHs) under the assumption that each of the PDSCHs has that same set of large-scale properties.

In some implementations, a BS can explicitly signal a QCL assumption to the UE, such as by Radio Resource Control (RRC) signaling QCL information on a per Carrier Component (CC) and per Band Width Part (BWP) basis. For example, the BS an explicitly signal one or more TCI states to the UE via RRC signal, each TCI state including QCL information regarding the antenna ports of PDSCHs that are transmitted by the BS.

Further, for a multi-DCI based multi-TRP network configuration, two QCL assumptions can be configured independently for each TRP. This configuration can be beneficial, for example, in enabling a BS (e.g., a gNB) to select the best beam for multi-PDSCH based on the latest beam reporting, regardless of the Transmission Configuration Indication (TCI) states of the Control Resource Sets (CORESETs) that are overlapped with the PDSCH in the Sub-Group 1.

In some implementations, when the TCI State of a Type 1 PDSCH is different with that of the CORESET associated with subsequent PDCCH Monitoring Occasions (MOs), a UE is not expected to transmit or receive within the switching gap before $T_0-X$ where $T_0$ is the start time of the first symbol of the CORESET associated with a PDCCH MO. In some other implementations, the PDSCH symbols that are overlapped with switching gap(s) can be omitted or punctured by the UE for beam switching to monitor PDCCH on the corresponding CORESETs. In some other implementations, a UE can skip the PDCCH MO if it is associated with different TCI states with that of overlapping Type-1 PDSCH(s) such that the unnecessary beam switching can be mitigated. In some other implementations, the TCI state of Type-1 PDSCH(s) can be assumed for the overlapped PDCCH MOs to avoid beam switching.

Figure 6:
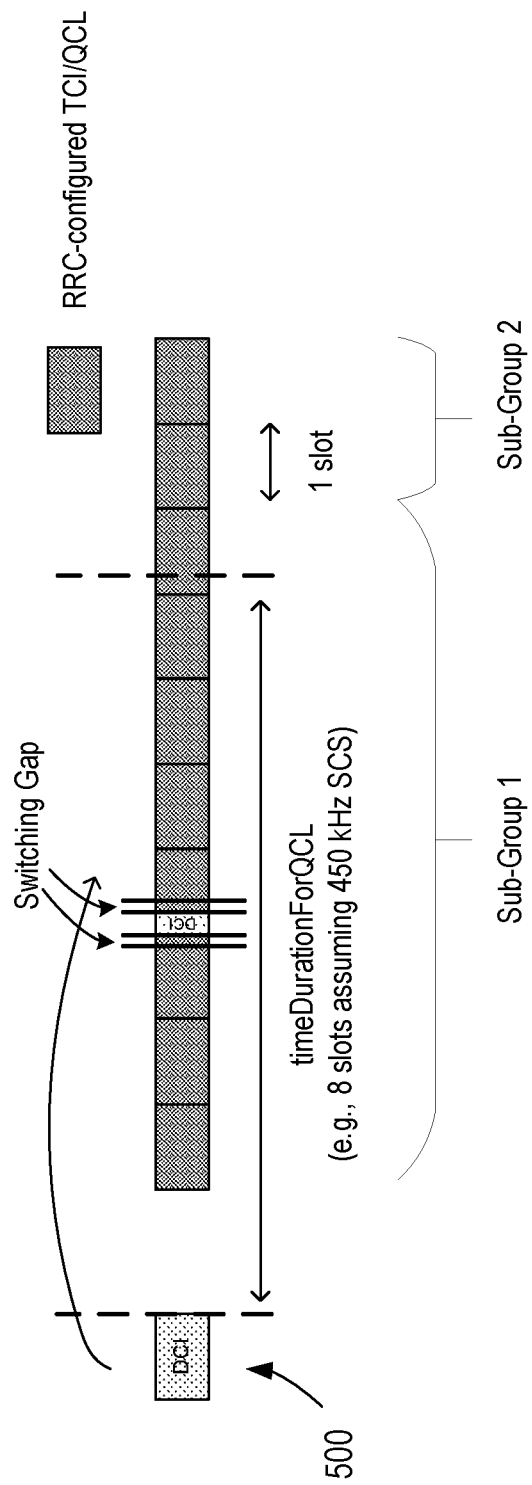
FIG. 6 is a diagram of an example PDCCH monitoring opportunity (MO) positioned in the middle of a multi-PDSCH transmission.

As an illustrative example, FIG. 6 shows a PDCCH MO in the middle of a multi-PDSCH transmission. In this example, each of the PDSCHs is processed according to RRC-configured TCI/QCL information.

In some implementations, a UE can determine a TCI state (and a corresponding QCL assumption) for all of the PDSCH by identifying the lowest CORESET ID in the latest monitored slot. For example, the UE can determine the TCI state for the lowest CORESET ID in the latest monitored slot, and apply the QCL information indicated in that TCI state for processing each of the PDSCHs (e.g., in both Sub-Group 1 and Sub-Group 2).

In some implementations, a UE can determine a TCI state (and a corresponding QCL assumption) for all of the PDSCH by identifying the first PDSCH (e.g., the sequentially first PDSCH) within a multi-PDSCH transmission. For example, the UE can determine TCI state for the first PDSCH in a sequence of scheduled PDSCHs, and apply the QCL information indicated by that TCI state for processing each of the PDSCHs in that sequence (e.g., in both Sub-Group 1 and Sub-Group 2).

In some implementations, a UE can determine a TCI state (and a corresponding QCL assumption) for all of the PDSCH by identifying, from a list of TCI states, the TCI state having the lowest codepoint value (e.g., a sequence of bits that uniquely identify each TCI state in the list). For example, the UE can determine QCL information for the TCI state having the lowest codepoint value (e.g., a sequence of bits 0 0 0), and apply the same QCL information for processing each of the PDSCHs in that sequence (e.g., in both Sub-Group 1 and Sub-Group 2). The codepoints for the TCI can be pre-determined (e.g., by an administrator of a wireless network), such that a particular TCI state (and correspondingly, particular QCL information) is used to process the PDSCHs by default, unless specified otherwise.

As described above, in some implementations, a BS can explicitly signal a TCI (and a corresponding a QCL assumption) to the UE, such as by RRC signaling. Further, for PDCCH MOs that have different TCI/QCL configurations compared to the RRC-configured TCI State for multi-PDSCH and the first symbol is after timeDurationForQCL, the TCI state of multi-PDSCHs can be applied for these overlapped PDCCH MOs to avoid gap-based beam switching.

Further, various techniques can be used to fast update RRC-configured QCL information and/or the TCI state.

As an example, a list of TCI states can be configured by RRC signaling, and used for fast activation. For instance, the list of TCI states can indicate (e.g., using a "firstActiveTCI" Information Element (IE)) that a particular TCI state should be activated upon RRC configuration of the TCI state list. As an example, this TCI state can be activated when the UE device is initially switched on and connected to a wireless network.

Further, a Media Access Control (MAC) Control Element (CE) can be used to selectively activate TCI states for multi-PDSCHs of a serving cell. For example, the MAC CE is identify a particular TCI state from the list of TCI states for activation. Upon receiving the MAC CE, a UE device can selectively activate the specified TCI state.

In some implementations, an activation MAC CE can be identified by a MAC sub-header with a dedicated Logical Channel ID (LCD) (e.g., a pre-determined LCD that is indicative of the MAC CE).

Further, the MAC CE can include a TCI-ID CE for indicating a particular TCI state from among the list of TCI states for activation. Further still, upon receipting a default TCI-ID update MAC CE in a slot n, a UE can apply the corresponding default TCI-ID from the beginning of a downlink slot n+k+1, where k is either reported as part of UE capability or hard-encoded in specification for all UEs (e.g., in accordance with a common technical standard).

Further, the MAC CE can include a CORESET Pool ID field to indicate a mapping between the activated TCI states and a ControlResourceSetId configured with CORESET Pool ID in multi-TRP use cases.

Figure 7:
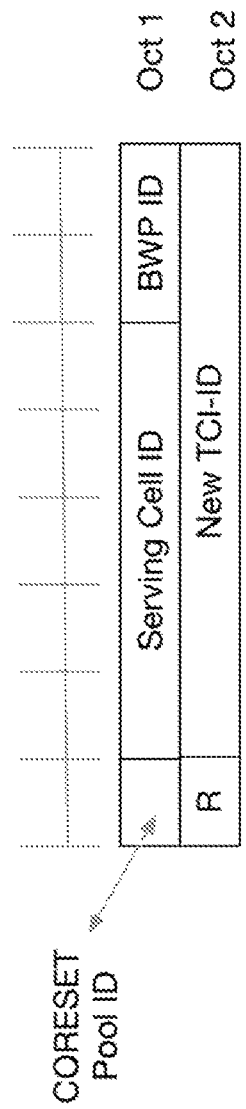
FIG. 7 is a diagram of an example Media Access Control (MAC) Control Element (CE).

FIG. 7 shows an example configuration of a MAC CE that can be used in at least some implementations.

In some implementations, the TCI field in the scheduling DCI can be used to selectively activate TCI states for multi-PDSCHs of a serving cell (e.g., either instead of or in addition to an activation MAC CE). For example, several codepoints of the TCI field can be used to indicate that different respective TCI states are to be activated. Further, one codepoint of the TCI field can be used to indicate that there is no change to the TCI state (e.g., the current TCI state should be maintained). For instance, a codepoint of all zeros (e.g., 000) or all ones (e.g., 111) can be used for this purpose.

In some implementations, the UE can receive an activation command by a MAC CE to map a subset of TCI states (e.g., up to seven TCI states) to the codepoints of the DCI field "TCI" in one CC/BWP or in a set of CCs/BWPs, respectively.

Alternatively, in some implementations, the N TCI states (e.g., seven TCI states) with the lowest index in the TCI list can be selected and mapped to the codepoints of the DCI field "TCI" (e.g., such that a separate activation MAC CE is not required).

An example list of codepoints for the DCI field "TCI" is shown below:

TABLE 2

Example list of codepoints for the DCI field "TCI."

| Value of TCI State (Codepoint) | Description |
| --- | --- |
| 000 | Do not update the TCI state. |
| 001 | Select and activate the first TCI state from the list of TCI states. |

TABLE 2-continued

Example list of codepoints for the DCI field "TCI."

| Value of TCI State (Codepoint) | Description |
|---|---|
| 010 | Select and activate the second TCI state from the list of TCI states. |
| 011 | Select and activate the third TCI state from the list of TCI states. |
| 100 | Select and activate the fourth TCI state from the list of TCI states. |
| 101 | Select and activate the fifth TCI state from the list of TCI states. |
| 110 | Select and activate the sixth TCI state from the list of TCI states. |
| 111 | Select and activate the seventh TCI state from the list of TCI states. |

In some implementations, the UE can assume that a new TCI state indicated by a multi-PDSCH scheduling DCI (e.g., indicated by a codepoint in the "TCI" field) can be applied for the next multi-PDSCH starting after slot n+k+1, where slot n is the slot that scheduling DCI is received.

In some implementations, value of k maybe subject to a UE capability report or hard-encoded (e.g., in accordance with a technical specification).

Figure 8:
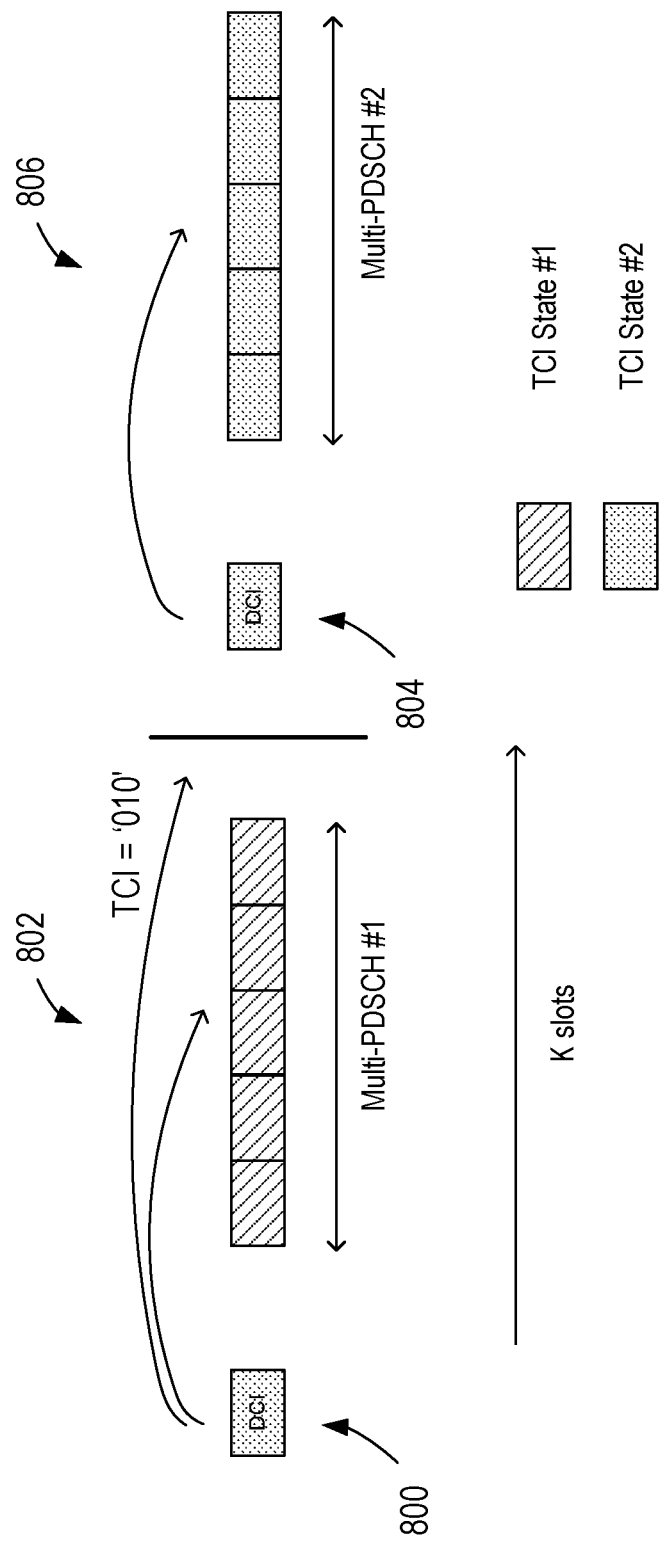
FIG. 8 is a diagram of an example application time for a TCI update.

FIG. 8 shows an example application time for a TCI update. In this example, a first DCI 800 includes scheduling information for a first set of PDSCHs 802 (e.g., multi-PDSCH #1), and a second DCI 804 includes scheduling information for a second set of PDSCHs 806 (e.g., multi-PDSCH #2). In this example, the first DCI 800 indicates an updated TCI state "010." This TCI state is applied after slot n+K+1 (e.g., beginning with the second set of PDSCHs 806 scheduled by the second DCI 804), and is maintained until the UE receives a further update regarding the TCI state.

In the examples described above, a UE can determine applying a single QCL assumption for all of the scheduled PDSCHs (e.g., both the PDSCHs in Sub-Group 1 and Sub-Group 2), regardless of the value of timeDuration-ForQCL. However, in some implementations, a UE can apply different QCL assumptions for the scheduled PDSCHs. For example, the UE can apply a first QCL assumption for the PDSCHs in the Sub-Group 1 (e.g., the PDSCHs prior to timeDurationForQCL) and a second QCL assumption for the PDSCHS in the Sub-Group 2 (e.g., the PDSCHs subsequent to timeDurationForQCL), where the first QCL assumption is different from the second QCL assumption.

As an example, a UE can determine a default TCI state (and corresponding default QCL information), and apply that TCI state to the PDSCHs in the Sub-Group 1. Further, the TCI state indicated in the DCI (e.g., the DCI scheduling the receive of the multi-PDSCHs) can be applied to the PDSCHs in the Sub-Group 2.

In some implementations, the default TCI state can be determined according to one or more the techniques described above. For example, a BS can explicitly indicate a default TCI to the UE via RRC signaling. As another example, the UE can identify the TCI state for the lowest CORESET ID in the latest monitored slot, and use that TCI state as the default TCI state. As another example, the UE can identify the TCI state for the first PDSCH in a sequence of scheduled PDSCHs, and use that TCI state as the default TCI state. As another example, a UE can identify, from a list of TCI states, the TCI state having the lowest codepoint value (e.g., a sequence of bits that uniquely identify each TCI state in the list), and use that TCI state as the default TCI state.

Figure 9:
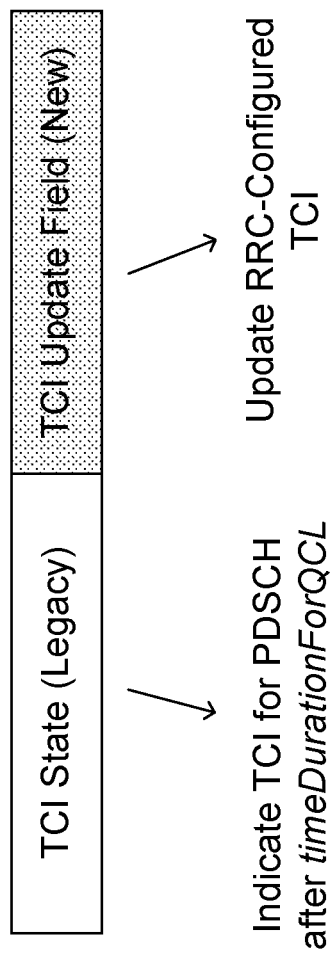
FIG. 9 is a diagram of an example DCI including two example information fields.

In some implementations, the DCI can include a dedicated "TCI state" field for filing an RRC-configured TCI state, (e.g., as shown in FIG. 9, "TCI update field (New)").

In some implementations, the DCI can include an information field indicating a TCI state for PDSCHs subsequent to timeDurationForQCL, and the same information field can be used to indicate subsequent updates to the TCI state (e.g., as shown in FIG. 9, "TCI State (legacy)"). This can be beneficial, for example, as a single information field can be used to both indicate TCI states and update TCI states, without requiring the use of a separate information field.

Figure 10A:
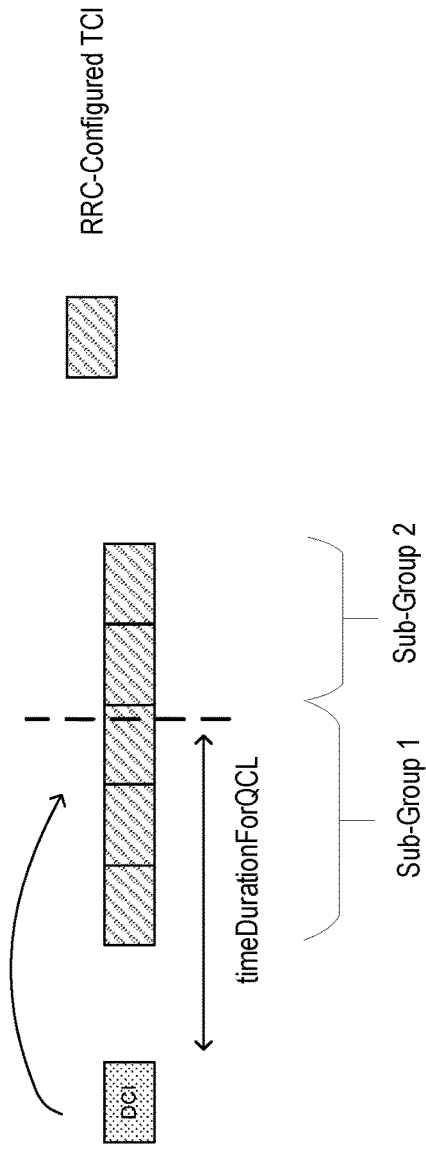
FIGS. 10A and 10B are diagrams of example configurations for applying TCI states to PDSCHs.
Figure 10B:
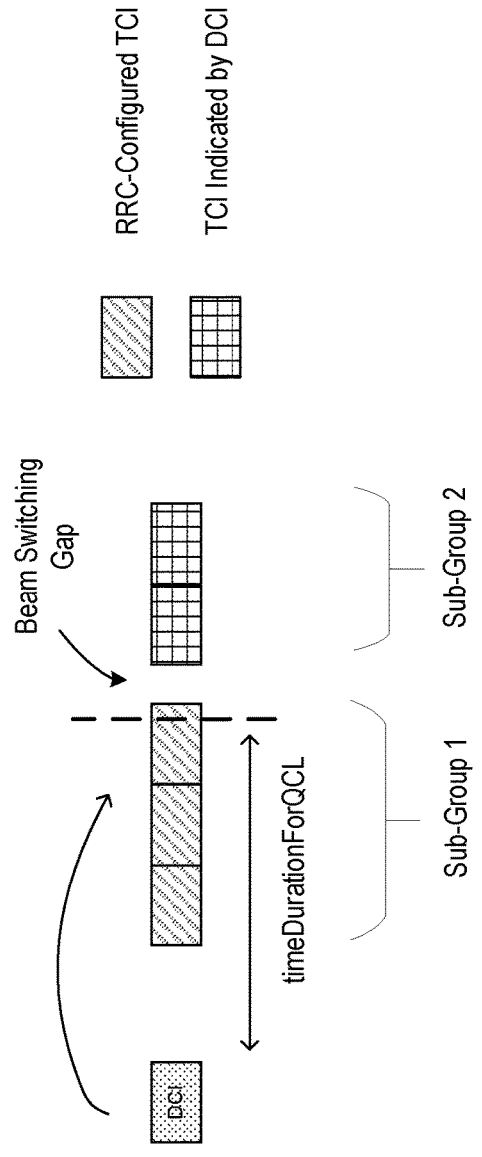

In some implementations, the TCI state(s) indicated by the TCI field in a multi-PDSCH scheduling DCI can be applied for the PDSCHs in the Sub-Group 2 on condition that there is beam switching gap reserved between PDSCHs with different beams. Otherwise, the RRC-configured TCI state is can be for all of PDSCHs in the Sub-Group 1 and the PDSCH in the Sub-Group 2. These configurations are shown in FIG. 10A (showing the same TCI states applied to PDSCHs in both Sub-Group 1 and Sub-Group 2, due to an absence of a beam switching gap between the sub-groups), and FIG. 10B (showing a first TCI state applied to PDSCHs in the Sub-Group 1 and a different second TCI state applied to PDSCHs in the Sub-Group 2 due to the presence of a beam switching gaps between the sub-grounds).

As described above (e.g., with reference to FIG. 2), an example SSB pattern 200 can be used in connection with network configurations having a 480 kHz and/or 960 kHz Subcarrier Spacing (SCS), for the FR2_2. In particular, the first symbols of a candidate SSB have an index $\{2, 9\}+14*n$, where index 0 corresponds to the first symbol of the first slot in a half-frame.

Further, various configurations can be used to obtain Received Signal Strength Indicator (RSSI) measurements with respect to this SSB pattern.

Figure 11:
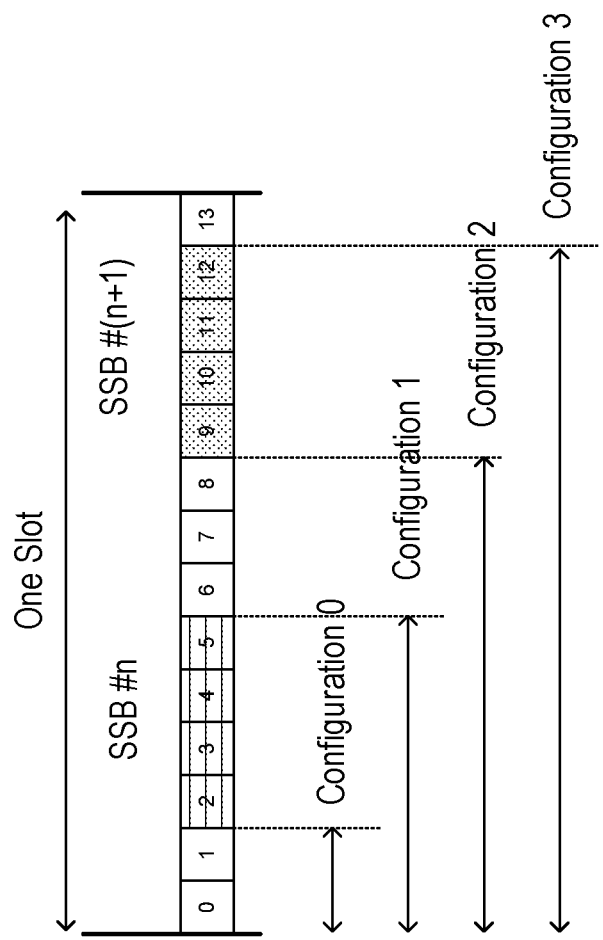
FIG. 11 is a diagram of example configurations for measuring RSSI.

For example, according to one configuration ("Configuration 0"), a UE can obtain a RSSI measurement over a time interval beginning from the symbol 0 of a slot, and ending before the starting symbol of the first SSB block in the slot. For example, as shown in FIG. 11, the UE can obtain an RSSI measurements for the symbol index values 0 and 1.

As another example, according to another configuration ("Configuration 1"), a UE can obtain a RSSI measurement over a time interval beginning from the symbol 0 of a slot, and ending at the last symbol of the first SSB block in the slot. For example, as shown in FIG. 11, the UE can obtain an RSSI measurements for the symbol index values 0 to 5.

As another example, according to another configuration ("Configuration 2"), a UE can obtain a RSSI measurement over a time interval beginning from the symbol 0 of a slot, and ending before the starting symbol of the second SSB block in the slot. For example, as shown in FIG. 11, the UE can obtain an RSSI measurements for the symbol index values 0 and 8.

As another example, according to another configuration ("Configuration 3"), a UE can obtain a RSSI measurement over a time interval beginning from the symbol 0 of a slot, and ending at the last symbol of the second SSB block in the slot. For example, as shown in FIG. 11, the UE can obtain an RSSI measurements for the symbol index values 0 to 12.

In some implementations, a BS can explicitly signal the RSSI measurement configuration to the UE (e.g., via RRC signaling).

Figure 13:
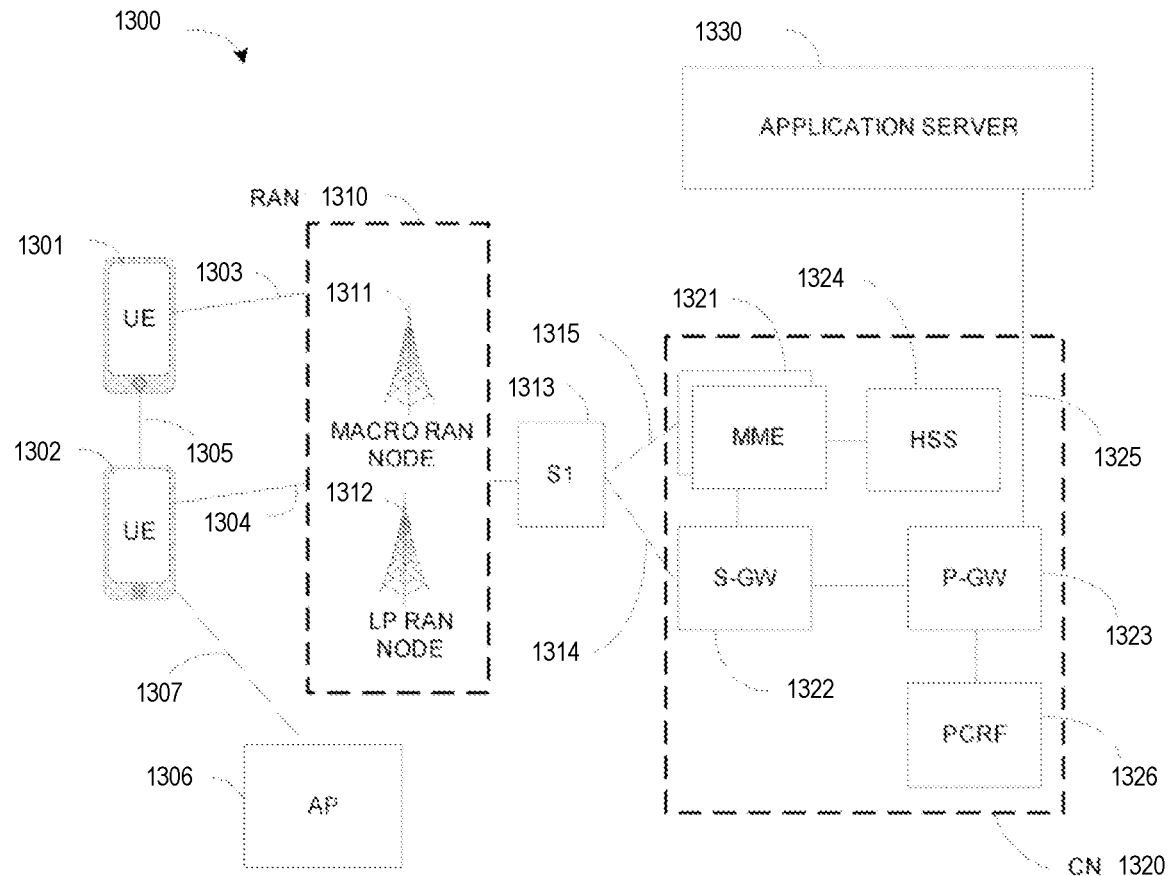
FIG. 13 is a diagram of an example architecture of a wireless network.

FIG. 13 illustrates an architecture of a system 1300 of a network in accordance with some embodiments. The system 1300 is shown to include a user equipment (UE) 1301 and a UE 1302. The UEs 1301 and 1302 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1301 and 1302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1301 and 1302 may be configured to connect, e.g., communicatively couple, with a radio access network (RAN) 1310—the RAN 1310 may be, for example, an Evolved Universal Mobile Telecommunications System (UMTS) Terrestrial Radio Access Network (E-UTRAN), a NextGen RAN (NG RAN), or some other type of RAN. The UEs 1301 and 1302 utilize connections 1303 and 1304, respectively, each of which comprises a physical communications interface or layer (discussed in further detail below); in this example, the connections 1303 and 1304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1301 and 1302 may further directly exchange communication data via a ProSe interface 1305. The ProSe interface 1305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1302 is shown to be configured to access an access point (AP) 1306 via connection 1307. The connection 1307 can comprise a local wireless connection, such as a connection consistent with any IEEE 802.15 protocol, where the AP 1306 would comprise a wireless fidelity (WiFi®) router. In this example, the AP 1306 is shown to be connected to the Internet without connecting to the core network of the wireless system (described in further detail below).

The RAN 1310 can include one or more access nodes that enable the connections 1303 and 1304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1310 may include one or more RAN nodes for providing macrocells, e.g., macro RAN node 1311, and one or more RAN nodes for providing femtocells or picocells (e.g., cells having smaller coverage areas, smaller user capacity, or higher bandwidth compared to macrocells), e.g., low power (LP) RAN node 1312.

Any of the RAN nodes 1311 and 1312 can terminate the air interface protocol and can be the first point of contact for the UEs 1301 and 1302. In some embodiments, any of the RAN nodes 1311 and 1312 can fulfill various logical functions for the RAN 1310 including, but not limited to, radio network controller (RNC) functions such as radio bearer management, uplink and downlink dynamic radio resource management and data packet scheduling, and mobility management.

In accordance with some embodiments, the UEs 1301 and 1302 can be configured to communicate using Orthogonal Frequency-Division Multiplexing (OFDM) communication signals with each other or with any of the RAN nodes 1311 and 1312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1311 and 1312 to the UEs 1301 and 1302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1301 and 1302. The physical downlink control channel (PDCCH) may carry information about the transport format and resource allocations related to the PDSCH channel, among other things. It may also inform the UEs 1301 and 1302 about the transport format, resource allocation, and HARQ (Hybrid Automatic Repeat Request) information related to the uplink shared channel. Typically, downlink scheduling (assigning control and shared channel resource blocks to the UE 1302 within a cell) may be performed at any of the RAN nodes 1311 and 1312 based on channel quality information fed back from any of the UEs 1301 and 1302. The downlink resource assignment information may be sent on the PDCCH used for (e.g., assigned to) each of the UEs 1301 and 1302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 1310 is shown to be communicatively coupled to a core network (CN) 1320—via an S1 interface 1313. In embodiments, the CN 1320 may be an evolved packet core (EPC) network, a NextGen Packet Core (NPC) network, or some other type of CN. In this embodiment the S1 interface 1313 is split into two parts: the S1-U interface 1314, which carries traffic data between the RAN nodes 1311 and 1312 and the serving gateway (S-GW) 1322, and the S1-mobility management entity (MME) interface 1315, which is a signaling interface between the RAN nodes 1311 and 1312 and MMES 1321.

In this embodiment, the CN 1320 comprises the MMES 1321, the S-GW 1322, the Packet Data Network (PDN) Gateway (P-GW) 1323, and a home subscriber server (HSS) 1324. The MMES 1321 may be similar in function to the control plane of legacy Serving General Packet Radio Service (GPRS) Support Nodes (SGSN). The MMES 1321 may manage mobility aspects in access such as gateway selection and tracking area list management. The HSS 1324 may comprise a database for network users, including subscription-related information to support the network entities' handling of communication sessions. The CN 1320 may comprise one or several HSSs 1324, depending on the number of mobile subscribers, on the capacity of the equipment, on the organization of the network, etc. For example, the HSS 1324 can provide support for routing/roaming, authentication, authorization, naming/addressing resolution, location dependencies, etc.

The S-GW 1322 may terminate the S1 interface 1313 towards the RAN 1310, and routes data packets between the RAN 1310 and the CN 1320. In addition, the S-GW 1322 may be a local mobility anchor point for inter-RAN node handovers and also may provide an anchor for inter-3GPP mobility. Other responsibilities may include lawful intercept, charging, and some policy enforcement.

The P-GW 1323 may terminate an SGi interface toward a PDN. The P-GW 1323 may route data packets between the EPC network 1323 and external networks such as a network including the application server 1330 (alternatively referred to as application function (AF)) via an Internet Protocol (IP) interface 1325. Generally, the application server 1330 may be an element offering applications that use IP bearer resources with the core network (e.g., UMTS Packet Services (PS) domain, LTE PS data services, etc.). In this embodiment, the P-GW 1323 is shown to be communicatively coupled to an application server 1330 via an IP communications interface 1325. The application server 1330 can also be configured to support one or more communication services (e.g., Voice-over-Internet Protocol (VoIP) sessions, PTT sessions, group communication sessions, social networking services, etc.) for the UEs 1301 and 1302 via the CN 1320.

The P-GW 1323 may further be a node for policy enforcement and charging data collection. Policy and Charging Enforcement Function (PCRF) 1326 is the policy and charging control element of the CN 1320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1326 may be communicatively coupled to the application server 1330 via the P-GW 1323. The application server 1330 may signal the PCRF 1326 to indicate a new service flow and select the appropriate Quality of Service (QoS) and charging parameters. The PCRF 1326 may provision this rule into a Policy and Charging Enforcement Function (PCEF) (not shown) with the appropriate traffic flow template (TFT) and QoS class of identifier (QCI), which commences the QoS and charging as specified by the application server 1330.

Figure 14:
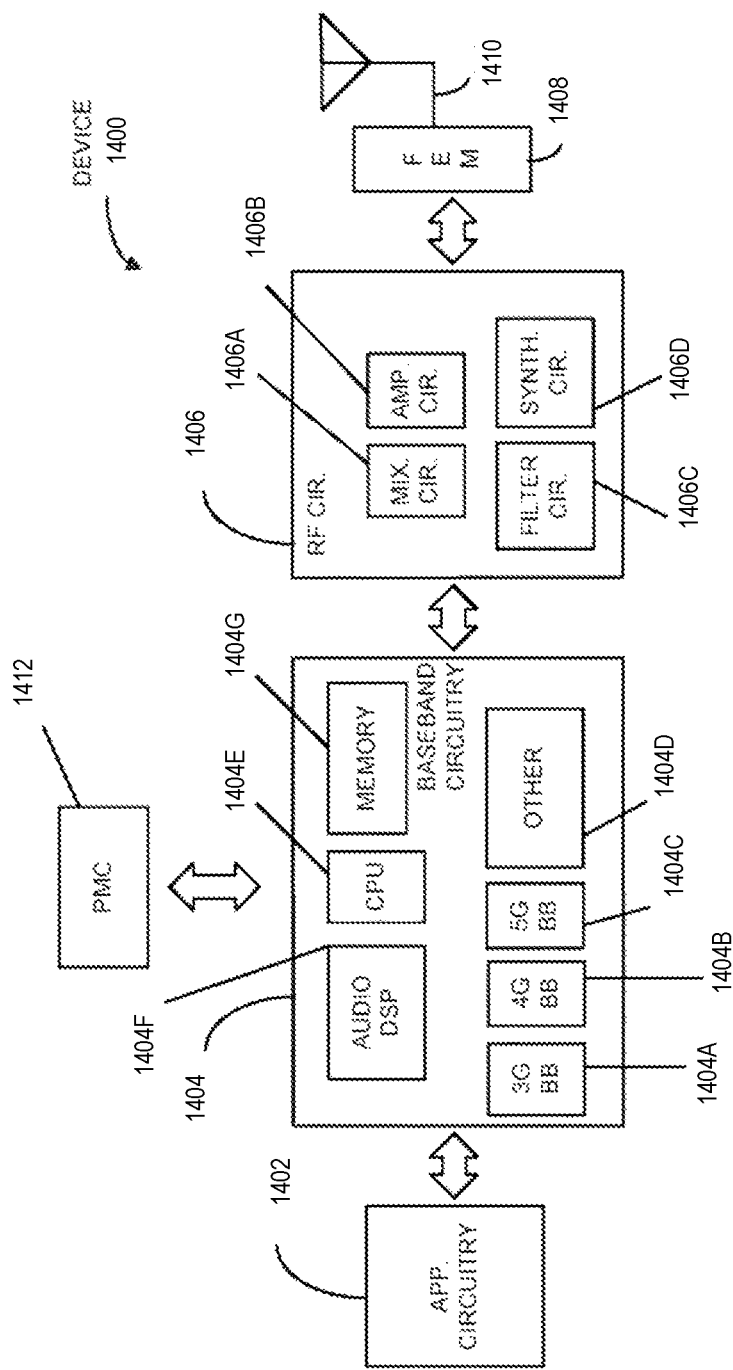
FIG. 14 is a diagram of an example wireless device (e.g., UE).

FIG. 14 illustrates example components of a device 1400 in accordance with some embodiments. In some embodiments, the device 1400 may include application circuitry 1402, baseband circuitry 1404, Radio Frequency (RF) circuitry 1406, front-end module (FEM) circuitry 1408, one or more antennas 1410, and power management circuitry (PMC) 1412 coupled together at least as shown. The components of the illustrated device 1400 may be included in a UE or a RAN node. In some embodiments, the device 1400 may include less elements (e.g., a RAN node may not utilize application circuitry 1402, and instead include a processor/controller to process IP data received from an EPC). In some embodiments, the device 1400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1400. In some embodiments, processors of application circuitry 1402 may process IP data packets received from an EPC.

The baseband circuitry 1404 may include circuitry such as, but not limited to, one or more single-core or multi-core processors. The baseband circuitry 1404 may include one or more baseband processors or control logic to process baseband signals received from a receive signal path of the RF circuitry 1406 and to generate baseband signals for a transmit signal path of the RF circuitry 1406. Baseband processing circuitry 1404 may interface with the application circuitry 1402 for generation and processing of the baseband signals and for controlling operations of the RF circuitry 1406. For example, in some embodiments, the baseband circuitry 1404 may include a third generation (3G) baseband processor 1404a, a fourth generation (4G) baseband processor 1404b, a fifth generation (5G) baseband processor 1404c, or other baseband processor(s) 1404d for other existing generations, generations in development or to be developed in the future (e.g., second generation (2G), sixth generation (6G), etc.). The baseband circuitry 1404 (e.g., one or more of baseband processors 1404a-d) may handle various radio control functions that enable communication with one or more radio networks via the RF circuitry 1406. In other embodiments, some or all of the functionality of baseband processors 1404a-d may be included in modules stored in the memory 1404g and executed via a Central Processing Unit (CPU) 1404e. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, or constellation mapping/demapping functionality. In some embodiments, encoding/decoding circuitry of the baseband circuitry 1404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include one or more audio digital signal processor(s) (DSP) 1404f. The audio DSP(s) 1404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the receive signal path of the RF circuitry 1406 may include mixer circuitry 1406a, amplifier circuitry 1406b and filter circuitry 1406c. In some embodiments, the transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RF signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a necessity. In some embodiments, mixer circuitry 1406a of the receive signal path may comprise passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FEM circuitry 1408. The baseband signals may be provided by the baseband circuitry 1404 and may be filtered by filter circuitry 1406c.

In some embodiments, the mixer circuitry 1406a of the receive signal path and the mixer circuitry 1406a of the transmit signal path may include two or more mixers and may be arranged for quadrature downconversion and upconversion, respectively. In some embodiments, the mixer circuitry 1406a of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a may be arranged for direct downconversion and direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a necessity. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410. In various embodiments, the amplification through the transmit or receive signal paths may be done solely in the RF circuitry 1406, solely in the FEM 1408, or in both the RF circuitry 1406 and the FEM 1408.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410).

In some embodiments, the PMC 1412 may manage power provided to the baseband circuitry 1404. In particular, the PMC 1412 may control power-source selection, voltage scaling, battery charging, or DC-to-DC conversion. The PMC 1412 may often be included when the device 1400 is capable of being powered by a battery, for example, when the device is included in a UE. The PMC 1412 may increase the power conversion efficiency while providing desirable implementation size and heat dissipation characteristics.

While FIG. 14 shows the PMC 1412 coupled only with the baseband circuitry 1404. However, in other embodiments, the PMC 1412 may be additionally or alternatively coupled with, and perform similar power management operations for, other components such as, but not limited to, application circuitry 1402, RF circuitry 1406, or FEM 1408.

In some embodiments, the PMC 1412 may control, or otherwise be part of, various power saving mechanisms of the device 1400. For example, if the device 1400 is in an RRC Connected state, where it is still connected to the RAN node as it expects to receive traffic shortly, then it may enter a state known as Discontinuous Reception Mode (DRX) after a period of inactivity. During this state, the device 1400 may power down for brief intervals of time and thus save power.

If there is no data traffic activity for an extended period of time, then the device 1400 may transition off to an RRC Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state, in order to receive data, it can transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1402 and processors of the baseband circuitry 1404 may be used to execute elements of one or more instances of a protocol stack. For example, processors of the baseband circuitry 1404, alone or in combination, may be used execute Layer 3, Layer 2, or Layer 1 functionality, while processors of the application circuitry 1404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 15:
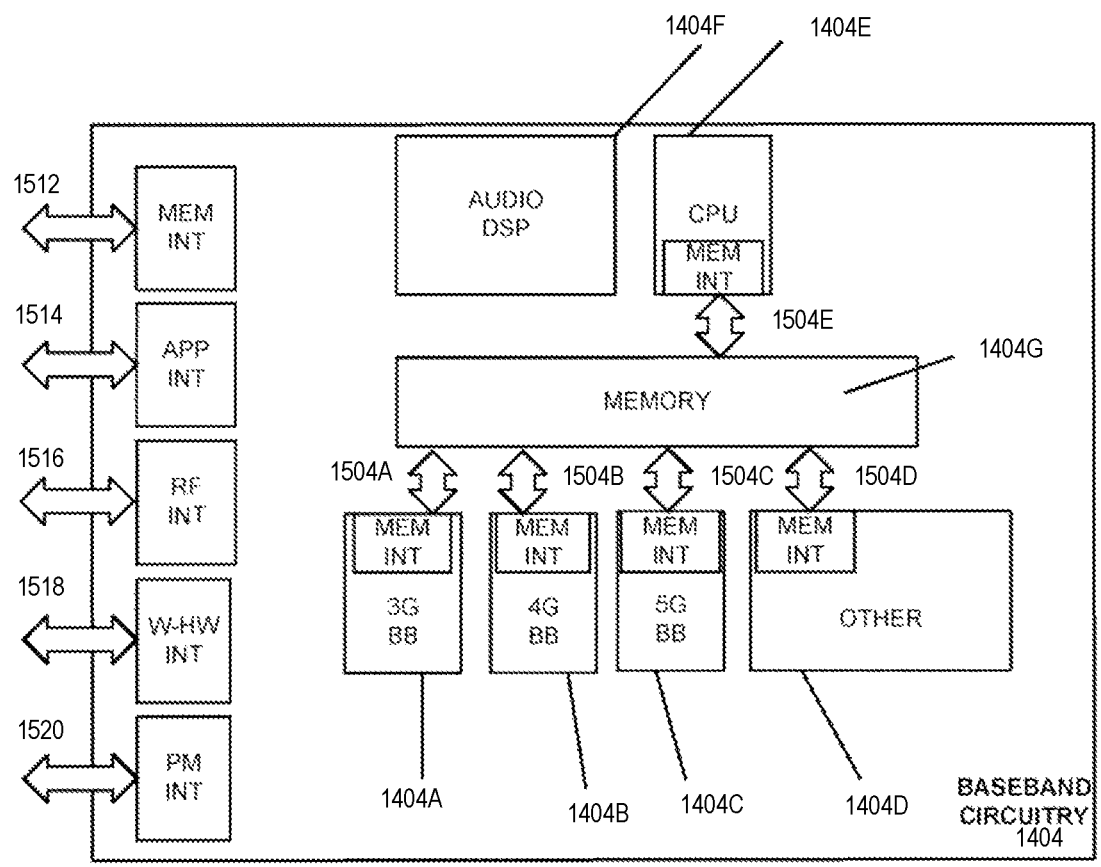
FIG. 15 is a diagram of example interfaces for baseband circuitry.

FIG. 15 illustrates example interfaces of baseband circuitry in accordance with some embodiments. As discussed above, the baseband circuitry 1404 of FIG. 14 may comprise processors 1404a-1404e and a memory 1404g utilized by said processors. Each of the processors 1404a-1404e may include a memory interface, 1504a-1504e, respectively, to send/receive data to/from the memory 1404g.

The baseband circuitry 1404 may further include one or more interfaces to communicatively couple to other circuitries/devices, such as a memory interface 1512 (e.g., an interface to send/receive data to/from memory external to the baseband circuitry 1404), an application circuitry interface 1514 (e.g., an interface to send/receive data to/from the application circuitry 1402 of FIG. 14), an RF circuitry interface 1516 (e.g., an interface to send/receive data to/from RF circuitry 1406 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMC 1412.

Figure 16:
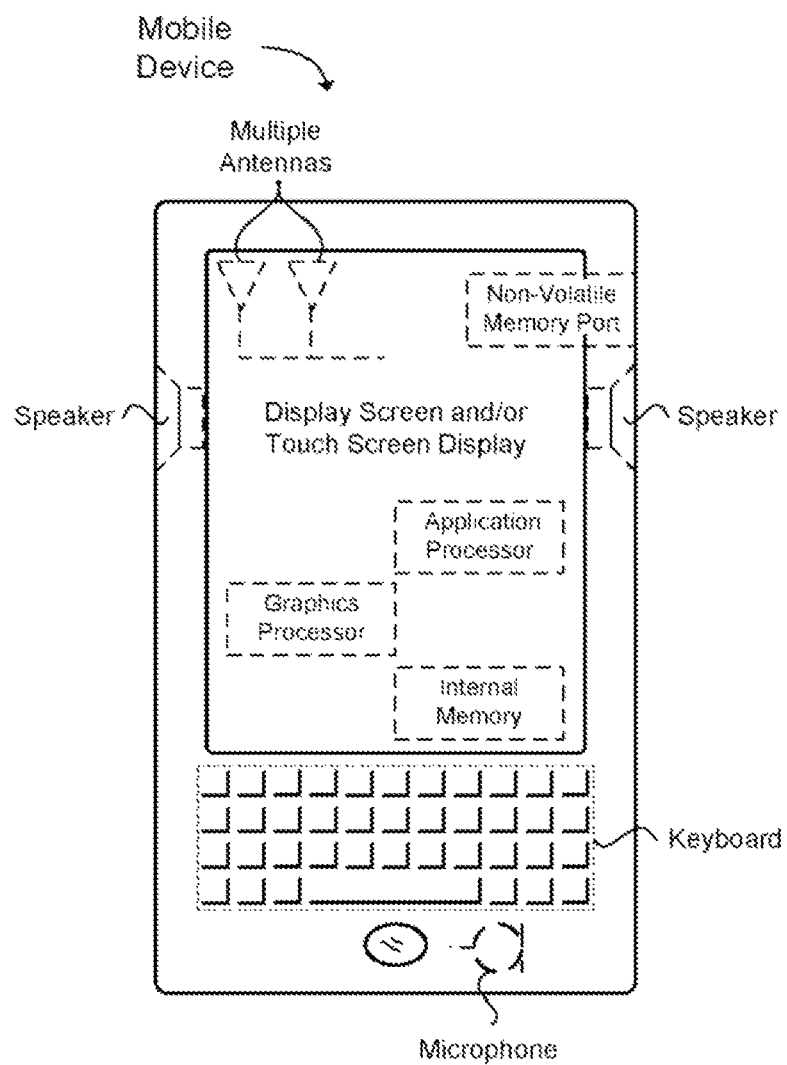
FIG. 16 is a diagram of an example wireless device (e.g., UE).

FIG. 16 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor).

The wireless modem can, in one example, modulate signals that the wireless device transmits via the one or more antennas and demodulate signals that the wireless device receives via the one or more antennas.

FIG. 16 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Figure 12A:
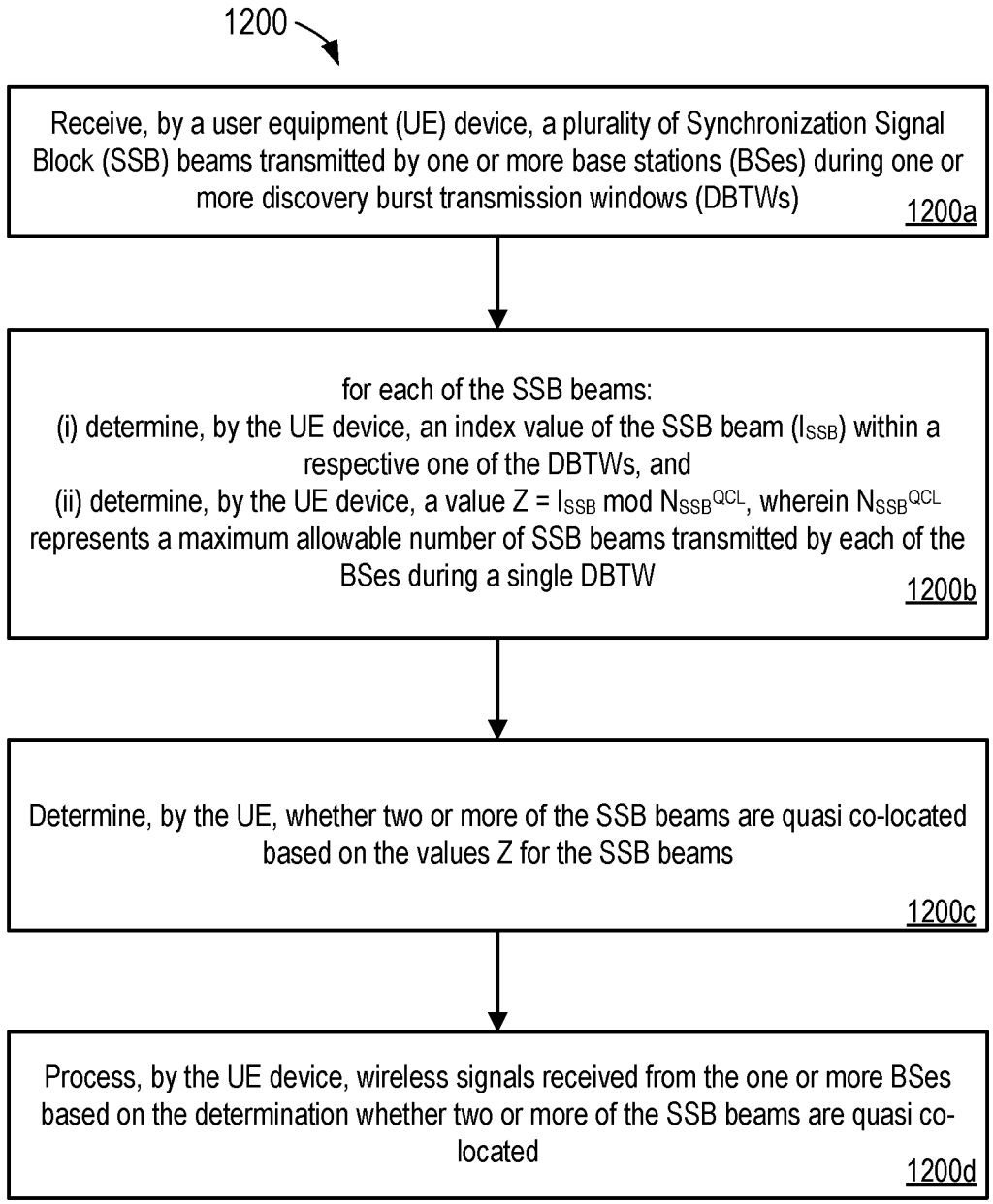

Example A1: A method includes: receiving, by a user equipment (UE) device, a plurality of Synchronization Signal Block (SSB) beams transmitted by one or more base stations (BSes) during one or more discovery burst transmission windows (DBTWs); for each of the SSB beams: determining, by the UE device, an index value of the SSB beam ($l_{SSB}$) within a respective one of the DBTWs, and determining, by the UE device, a value $Z=l_{SSB}$ mod $N_{SSB}^{QCL}$, where $N_{SSB}^{QCL}$ represents a maximum allowable number of SSB beams transmitted by each of the BSes during a single DBTW; determining, by the UE, whether two or more of the SSB beams are quasi co-located based on the values Z for the SSB beams; and processing, by the UE device, wireless signals received from the one or more BSes based on the determination whether two or more of the SSB beams are quasi co-located. FIG. A flow chart diagram representing Example A1 is shown in FIG. 12A.

Example A2: A method includes the method of Example A1. Further, determining whether two or more of the SSB beams are quasi co-located includes: determining that the value Z for a first SSB beam from among the plurality of SSB beams is equal to the value Z for a second SSB beam from among the plurality of SSB beams, and determining that the first SSB beam and the second SSB beams are quasi co-located based the determination that the value Z for the first SSB beam is equal to the value Z for the second SSB beam.

Example A3: A method includes the method of any of Examples A1 and A2. Further, determining whether two or more of the SSB beams are quasi co-located includes: determining that the value Z for a first SSB beam from among the plurality of SSB beams is not equal to the value Z for a second SSB beam from among the plurality of SSB beams, and determining that the first SSB beam and the second SSB beams are not quasi co-located based the determination that the value Z for the first SSB beam is not equal to the value Z for the second SSB beam.

Example A4: A method includes the method of any of Examples A1 to A3. Further, a value of $N_{SSB}^{QCL}$ is selected from a set consisting of 16, 32, and 64.

Example A5: A method includes the method of any of Examples A1 to A3. Further, the method includes: determining a value of $N_{SSB}^{QCL}$ based on a master information block (MIB) transmitted from one or more BSes to the UE device.

Example A6: A method includes the method of any of Examples A1 to A3. Further, processing the wireless signals received from the one or more BSes includes: upon determining that the two or more of the SSB beams are quasi co-located, demodulating the wireless signals according to at least one of: a common Doppler shift parameter, a common a Doppler spread parameter, a common average delay parameter, a common delay spread parameter ports, or a common spatial receiving parameter.

Example A7: A system includes one or more processors and computer-readable media storing instructions that, when executed by the one or more processors, cause the one or more processors to perform the method of any of the Examples A1 to A6.

Example A8: A user equipment (UE device) including one or more processors and computer-readable media storing instructions that, when executed by the one or more processors, cause the one or more processors to perform the method of any of the Examples A1 to A6.

Example A9: One or more non-transitory computer-readable media stores instructions that, when executed by one or more processors, cause the one or more processors to perform the method of any of Examples A1 to A6.

Example A10: A baseband processor is configured to perform the method of any of Examples A1 to A6.

Figure 12B:
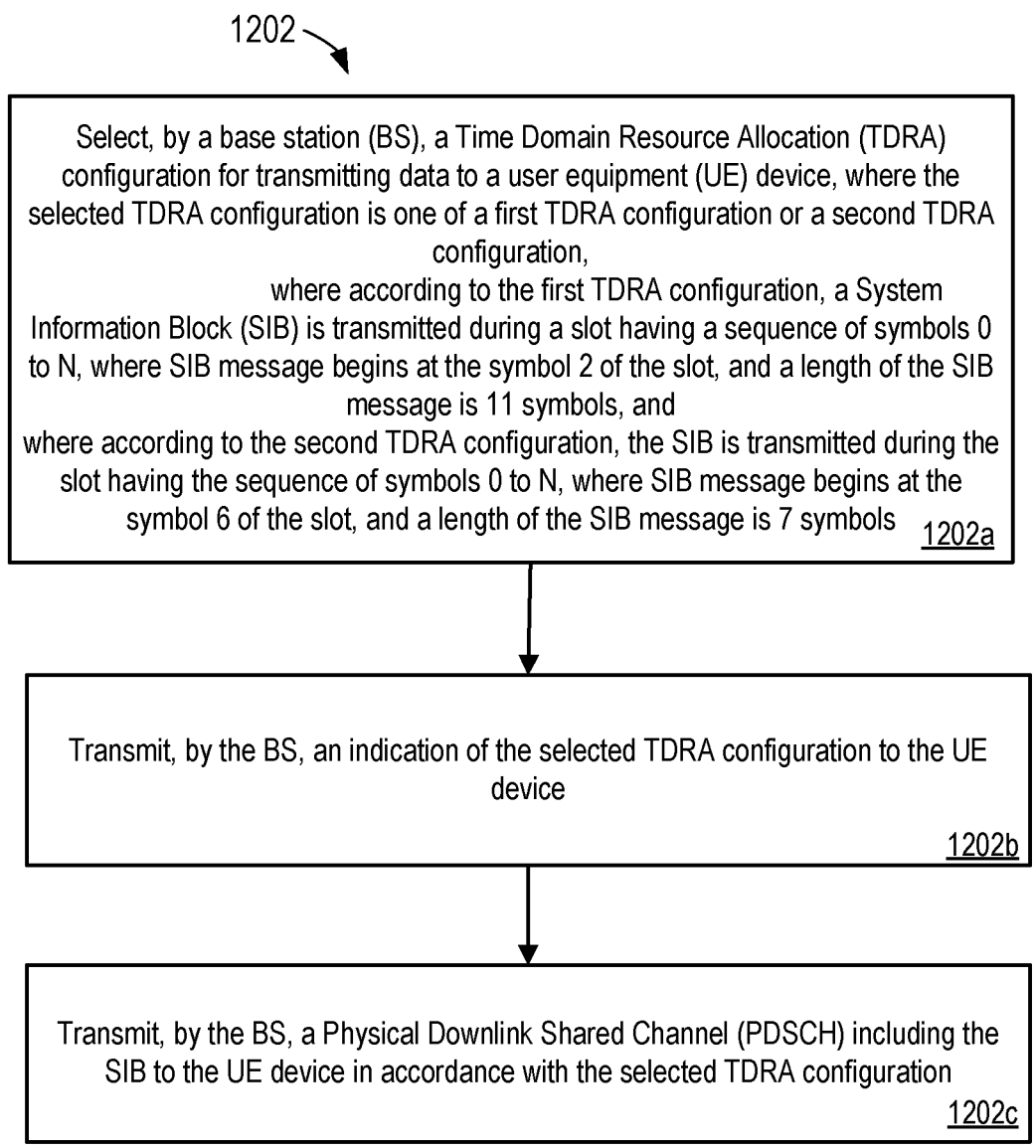

Example B1: A method includes: selecting, by a base station (BS), a Time Domain Resource Allocation (TDRA) configuration for transmitting data to a user equipment (UE) device, where the selected TDRA configuration is one of a first TDRA configuration or a second TDRA configuration. According to the first TDRA configuration, a System Information Block (SIB) is transmitted during a slot having a sequence of symbols 0 to N, where SIB message begins at the symbol 2 of the slot, and a length of the SIB message is 11 symbols. According to the second TDRA configuration, the SIB is transmitted during the slot having the sequence of symbols 0 to N, where SIB message begins at the symbol 6 of the slot, and a length of the SIB message is 7 symbols. The method also includes transmitting, by the BS, an indication of the selected TDRA configuration to the UE device; and transmitting, by the BS, a Physical Downlink Shared Channel (PDSCH) including the SIB to the UE device in accordance with the selected TDRA configuration. A flow chart diagram representing Example B1 is shown in FIG. 12B.

Example B2: A method includes the method of Example B1. Further, transmitting the indication of the selected TDRA configuration includes: transmitting Downlink Control Information (DCI) to the UE device, the DCI including the indication of the selected TDRA configuration.

Example B3: A method includes the method of any of Examples B1 and B1. Further, the first TDRA configuration corresponds to a Type A Physical Downlink Shared Channel (PDSCH) mapping.

Example B4: A method includes the method of any of Examples B1 to B3. Further, the second TDRA configuration corresponds to a Type B Physical Downlink Shared Channel (PDSCH) mapping.

Example B5: A method includes the method of any of Examples B1 to B4. Further, according to the second TDRA configuration, a Synchronization Signal Block (SSB) is transmitted in the slot, where SSB begins at the symbol 2 of the slot, and a length of the SSB is four symbols.

Example B6: A method includes the method of any of Examples B1 to B5. Further, according to the first TDRA configuration, there is an absence of a Synchronization Signal Block (SSB) transmitted during the slot.

Example B7: A method includes the method of any of Examples B1 to B6. Further, according to the first TDRA configuration and the second TDRA configuration, the symbol N of the slot is reserved for indicating a beam switch.

Example B8: A method includes the method of any of Examples B1 to B7. Further, N is 13.

Example B9: A method includes the method of any of Examples B1 to B8. Further, the first TDRA configuration and the second TDRA configuration correspond to a Subcarrier Spacing (SCS) of at least one of 480 kHz or 960 kHz.

Example B10: A system includes one or more processors and computer-readable media storing instructions that, when executed by the one or more processors, cause the one or more processors to perform the method of any of Examples B1 to B9.

Example B11: A base station (BS) includes one or more processors and computer-readable media storing instructions that, when executed by the one or more processors, cause the one or more processors to perform the method of any of the Examples B1 to B9.

Example B12: One or more non-transitory computer-readable media stores instructions that, when executed by one or more processors, cause the one or more processors to perform the method of any of Examples B1 to B9.

Example B13: A baseband processor is configured to perform the method of any of Examples B1 to B9.

Figure 12C:
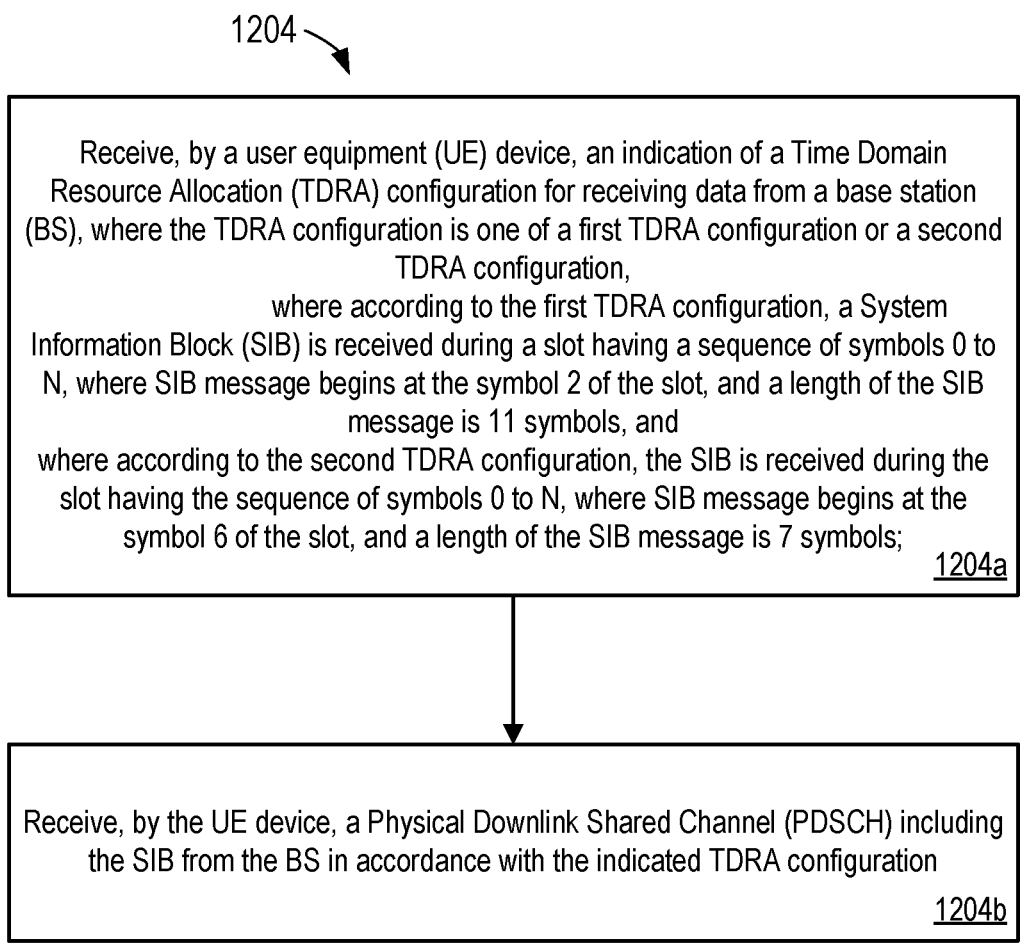

Example C1: A method includes: receiving, by a user equipment (UE) device, an indication of a Time Domain Resource Allocation (TDRA) configuration for receiving data from a base station (BS), where the TDRA configuration is one of a first TDRA configuration or a second TDRA configuration. According to the first TDRA configuration, a System Information Block (SIB) is received during a slot having a sequence of symbols 0 to N, where SIB message begins at the symbol 2 of the slot, and a length of the SIB message is 11 symbols. According to the second TDRA configuration, the SIB is received during the slot having the sequence of symbols 0 to N, where SIB message begins at the symbol 6 of the slot, and a length of the SIB message is 7 symbols. The method also includes receiving, by the UE device, a Physical Downlink Shared Channel (PDSCH) including the SIB from the BS in accordance with the indicated TDRA configuration. A flow chart diagram representing Example C1 is shown in FIG. 12C.

Example C2: A method includes the method of Example C1. Further, receiving the indication of the TDRA configuration includes: receiving Downlink Control Information (DCI) from the BS, the DCI including the indication of the TDRA configuration.

Example C3: A method includes the method of any of Examples C1 and C2. Further, the first TDRA configuration corresponds to a Type A Physical Downlink Shared Channel (PDSCH) mapping.

Example C4: A method includes the method of any of Examples C1 to C3. Further, the second TDRA configuration corresponds to a Type B Physical Downlink Shared Channel (PDSCH) mapping.

Example C5: A method includes the method of any of Examples C1 to C4. Further, according to the second TDRA configuration, a Synchronization Signal Block (SSB) is received in the slot, where SSB begins at the symbol 2 of the slot, and a length of the SSB is four symbols.

Example C6: A method includes the method of any of Examples C1 to C5. Further, according to the first TDRA configuration, there is an absence of a Synchronization Signal Block (SSB) received during the slot.

Example C7: A method includes the method of any of Examples C1 to C6. Further, according to the first TDRA configuration and the second TDRA configuration, the symbol N in the slot is reserved for indicating a beam switch.

Example C8: A method includes the method of any of Examples C1 to C7. Further, N is 13.

Example C9: A method includes the method of any of Examples C1 to C8. Further, the first TDRA configuration and the second TDRA configuration correspond to a Sub-carrier Spacing (SCS) of at least one of 480 kHz or 960 kHz.

Example C10: A system includes one or more processors and computer-readable media storing instructions that, when executed by the one or more processors, cause the one or more processors to perform the method of any of Examples C1 to C9.

Example C11: A user equipment (UE) device includes one or more processors and computer-readable media storing instructions that, when executed by the one or more processors, cause the one or more processors to perform the method of any of Examples C1 to C9.

Example C12: One or more non-transitory computer-readable media stores instructions that, when executed by one or more processors, cause the one or more processors to perform the method of any of Examples C1 to C9.

Example C13: A baseband processor is configured to perform the method of any of Examples C1 to C9.

Figure 12D:
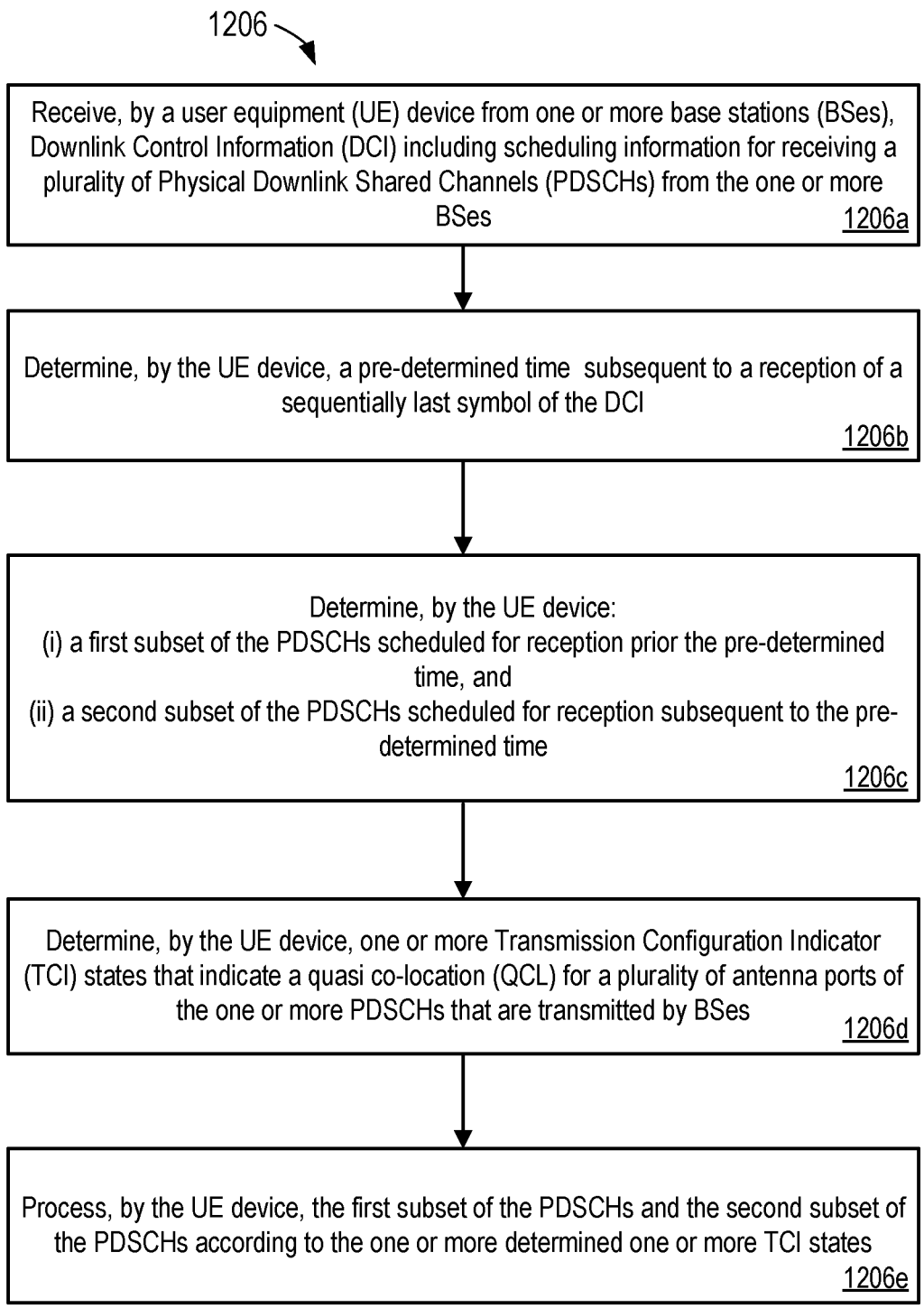

Example D1: A method includes: receiving, by a user equipment (UE) device from one or more base stations (BSes), Downlink Control Information (DCI) including scheduling information for receiving a plurality of Physical Downlink Shared Channels (PDSCHs) from the one or more BSes; determining, by the UE device, a pre-determined time subsequent to a reception of a sequentially last symbol of the DCI; determining, by the UE device: a first subset of the PDSCHs scheduled for reception prior the pre-determined time, and a second subset of the PDSCHs scheduled for reception subsequent to the pre-determined time; determining, by the UE device, one or more Transmission Configuration Indicator (TCI) states that indicate a quasi co-location (QCL) for a plurality of antenna ports of the one or more PDSCHs that are transmitted by BSes; and processing, by the UE device, the first subset of the PDSCHs and the second subset of the PDSCHs according to the one or more determined one or more TCI states. A flow chart diagram representing Example D1 is shown in FIG. 12D.

Example D2: A method includes the method of Example D1. Further, processing the first subset of the PDSCHs and the second subset of the PDSCHs according to the one or more determined TCI states includes: processing Down Link (DL) Reference Signals (RS) of the first subset of the PDSCHs and the second subset of the PDSCHs according to at least one of: a common Doppler shift parameter, a common a Doppler spread parameter, a common average delay parameter, a common delay spread parameter ports, or a common spatial receiving parameter.

Example D3: A method includes the method of any of Examples D1 and D2. Further, determining the one or more TCI states includes: receiving configuration data indicating the one or more TCI states from the one or more BSes via Radio Resource Control (RRC) signaling, where each of the one or more TCI states includes quasi co-location information for a plurality of dedicated demodulation reference signal (DM-RS) ports of the plurality of PDSCHSs.

Example D4: A method includes the method of any of Examples D1 to D3. Further, the method includes: receiving a list of TCI states via RRC signaling, where each of the TCI states of the list of TCI states includes QCL information for the plurality of DM-RS ports of the plurality of the PDSCHs, and where the list of TCI states indicates a default TCI state from among the list of TCI states, and upon receiving the list of TCI states, activating the default TCI state for receiving at least of some of the plurality of DM-RS ports of the plurality of PDSCHs.

Example D5: A method includes the method of any of Examples D1 to D4. Further, the method includes: receiving a Media Access Control (MAC) Control Element (CE), the MAC CE including an indication of a particular TCI state from among the list of TCI for activation; and upon receiving the MAC CE, activating the particular TCI state for receiving at least of some of the plurality of DM-RS ports of the plurality of PDSCHs.

Example D6: A method includes the method of any of Examples D1 to D5. Further, the method includes: receiving a Media Access Control (MAC) Control Element (CE), the MAC CE including a list of TCI states, where each of the TCI states of the list of TCI states includes QCL information for the plurality of DM-RS ports of the plurality of PDSCHs, and where each of the TCI states of the list of TCI states is associated with respective codepoint value; determining a particular codepoint value indicated in the DCI; activating the TCI state of the list of TCI states corresponding to the particular codepoint value; and receiving at least some of the DM-RS ports of the plurality of PDSCHs according to the activated TCI state.

Example D7: A method includes the method of any of Examples D1 to D6. Further, the method includes: determining a list of TCI states, where each of the TCI states of the list of TCI states includes QCL information for the plurality DM-RS ports of the plurality of PDSCHs, and where each of the TCI states of the list of TCI states is associated with respective index value; selecting a subset of the TCI states having the N lowest index values; associating each of the selected TCI states with respective codepoint value; determining a particular codepoint value indicated in the DCI; activating the TCI state of the list of selected TCI states corresponding to the particular codepoint value; and receiving at least some of the DM-RS ports of the plurality of PDSCHs according to the activated TCI state.

Example D8: A method includes the method of any of Examples D1 to D7. Further, determining the one or more TCI states includes: monitoring a plurality of slots for a transmission of the DCI by the one or more BSes; determining, for the most recently monitored slot, a Control Resource Set (CORESET) having a lowest CORESET identifier (CORESET ID) from among the CORESETs of that slot; and selecting a TCI state for that CORESET as the one or more TCI states for processing the first subset of the PDSCHs and the second subset of the PDSCHs.

Example D9: A method includes the method of any of Examples D1 to D8. Further, determining the one or more TCI states QCL includes: determining a TCI state for a sequentially first PDSCH among the plurality of PDSCHs; and selecting the TCI state for the sequentially first PDSCH as the one or more TCI states for processing the first subset of the PDSCHs and the second subset of the PDSCHs.

Example D10: A method includes the method of any of Examples D1 to D9. Further, determining the assumption of QCL includes: determining a plurality of Transmission Control Information (TCI) states, each having a corresponding codepoint value; determining a first TCI state having a lowest codepoint value from among TCI states; and selecting the first TCI state for processing as the first subset of the PDSCHs and the second subset of the PDSCHs.

Example D11: A method includes the method of any of Examples D1 to D10. Further, the pre-determined time corresponds to a minimum length of time between the reception of the sequentially last symbol the DCI and application of QCL information received the DCI for processing PDSCHs.

Example D12: A method includes the method of any of Examples D1 to D11. Further, the pre-determined time corresponds to a Subcarrier Spacing (SCS) 120 kHz, and where the pre-determined time corresponds to one or two slots.

Example D13: A method includes the method of any of Examples D1 to D12. Further, the pre-determined time corresponds to a Subcarrier Spacing (SCS) 480 kHz, and where the pre-determined time corresponds to 8 slots or fewer.

Example D14: A method includes the method of any of Examples D1 to D14. Further, the pre-determined time corresponds to a Subcarrier Spacing (SCS) 960 kHz, and where the pre-determined time corresponds to up to 16 slots or greater.

Example D15: A system includes one or more processors and computer-readable media storing instructions that, when executed by the one or more processors, cause the one or more processors to perform the method of any of Examples D1 to D14.

Example D16: A user equipment (UE) device includes one or more processors and computer-readable media storing instructions that, when executed by the one or more processors, cause the one or more processors to perform the method of any of Examples D1 to D14.

Example D17: One or more non-transitory computer-readable media stores instructions that, when executed by one or more processors, cause the one or more processors to perform the method of any of Examples D1 to D14.

Example D18: A baseband processor is configured to perform the method of any of Examples D1 to D14.

Figure 12E:
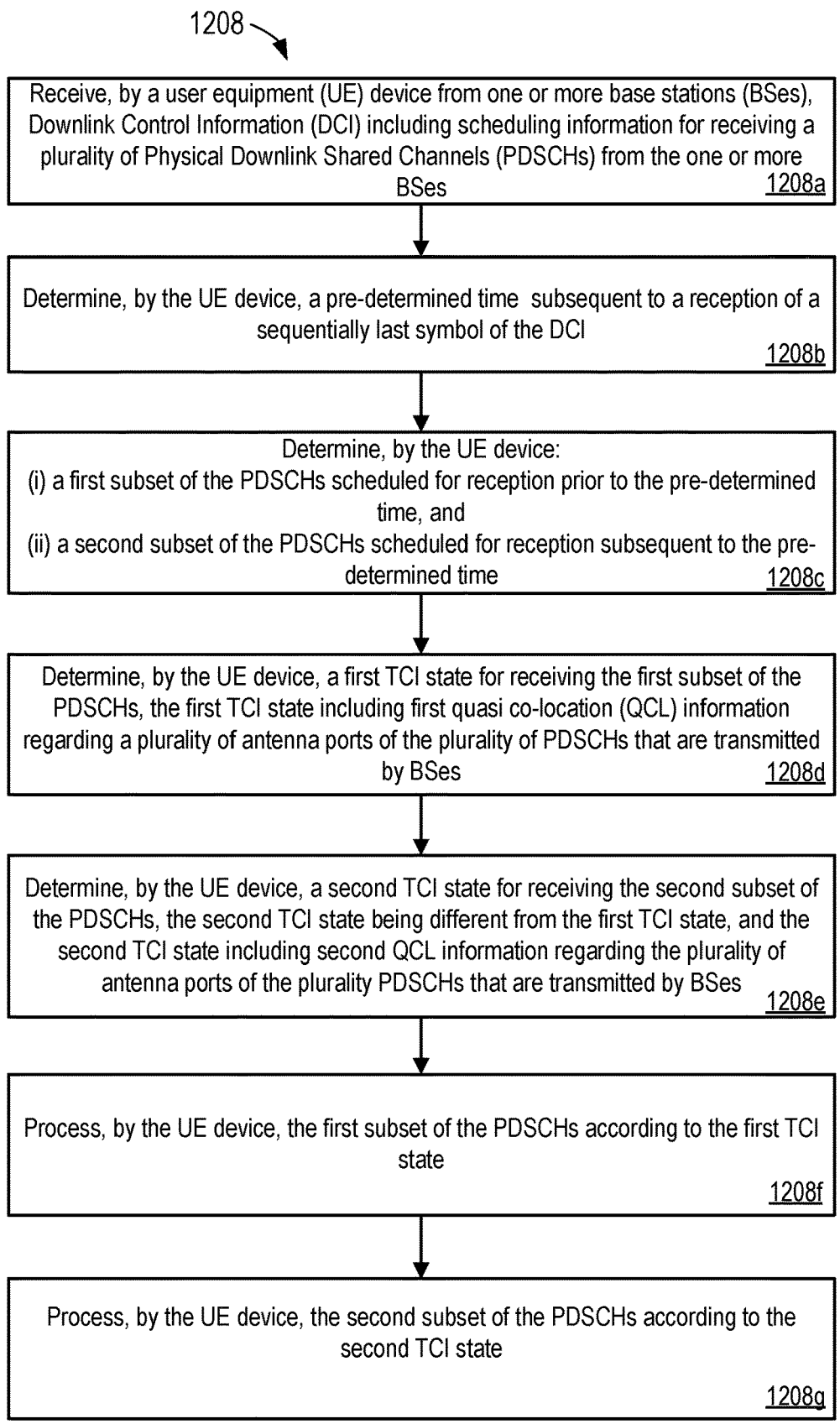

Example E1: A method includes: receiving, by a user equipment (UE) device from one or more base stations (BSes), Downlink Control Information (DCI) including scheduling information for receiving a plurality of Physical Downlink Shared Channels (PDSCHs) from the one or more BSes; determining, by the UE device, a pre-determined time subsequent to a reception of a sequentially last symbol of the DCI; determining, by the UE device: a first subset of the PDSCHs scheduled for reception prior to the pre-determined time, and a second subset of the PDSCHs scheduled for reception subsequent to the pre-determined time; determining, by the UE device, a first TCI state for receiving the first subset of the PDSCHs, the first TCI state including first quasi co-location (QCL) information regarding a plurality of antenna ports of the plurality of PDSCHs that are transmitted by BSes; determining, by the UE device, a second TCI state for receiving the second subset of the PDSCHs, the second TCI state being different from the first TCI state, and the second TCI state including second QCL information regarding the plurality of antenna ports of the plurality PDSCHs that are transmitted by BSes; processing, by the UE device, the first subset of the PDSCHs according to the first TCI state; and processing, by the UE device, the second subset of the PDSCHs according to the second TCI state. A flow chart diagram representing Example E1 is shown in FIG. 12E.

Example E2: A method includes the method of Example E1. Further, processing the first subset of the PDSCHs according to the first TCI state includes: processing Down Link (DL) Reference Signals (RS) of the first subset of the PDSCHs according to at least one of: a common Doppler shift parameter, a common a Doppler spread parameter, a common average delay parameter, a common delay spread parameter ports, or a common spatial receiving parameter.

Example E3: A method includes the method of any of Examples E1 and E2. Further, processing the second subset of the PDSCHs according to the second TCI state includes: processing Down Link (DL) Reference Signals (RS) of the second subset of the PDSCHs according to at least one of: a common Doppler shift parameter, a common a Doppler spread parameter, a common average delay parameter, a common delay spread parameter ports, or a common spatial receiving parameter.

Example E4: A method includes the method of any of Examples E1 to E3. Further, determining the first TCI state includes: receiving configuration data indicating the first TCI state from the one or more BSes via Radio Resource Control (RRC) signaling.

Example E5: A method includes the method of any of Examples E1 to E4. Further, determining the first TCI state includes: monitoring a plurality of slots for a transmission of the DCI by the one or more BSes; determining, for the most recently monitored slot, a Control Resource Set (CORESET) having a lowest CORESET identifier (CORESET ID) from among the CORESETs of that slot; and selecting a TCI state for that CORESET as the first TCI state.

Example E6: A method includes the method of any of Examples E1 to E5. Further, determining the first TCI state includes: determining a TCI state for a sequentially first PDSCH among the plurality of PDSCHs; and selecting the TCI state for the sequentially first PDSCH as the first TCI state.

Example E7: A method includes the method of any of Examples E1 to E6. Further, determining the first TCI state includes: determining a plurality of TCI states, each having a corresponding codepoint value; determining a particular TCI state having a lowest codepoint value from among the TCI states; and selecting the particular TCI state as the first TCI state.

Example E8: A method includes the method of any of Examples E1 to E7. Further, determining the second TCI state includes: receiving an indication of the second TCI state stored in an information field of the DCI.

Example E9: A method includes the method of any of Examples E1 to E8. Further, the information field of the DCI includes an indication of a specified TCI state for receiving PDSCHs after the pre-determined time.

Example E10: A method includes the method of any of Examples E1 to E9. Further, determining the first TCI state includes: receiving configuration data indicating the first TCI state from the one or more BSes via Radio Resource Control (RRC) signaling, and where the information field of the DCI includes an indication of an update to the first TCI state.

Example E11: A method includes the method of any of Examples E1 to E10. Further, the pre-determined time corresponds to a minimum length of time between the reception of the sequentially last symbol of the DCI and application of QCL information received the DCI for processing PDSCHs.

Example E12: A method includes the method of any of Examples E1 to E11. Further, the pre-determined time corresponds to a Subcarrier Spacing (SCS) 120 kHz, and where the pre-determined time corresponds to one or two slots.

Example E13: A method includes the method of any of Examples E1 to E12. Further, the pre-determined time corresponds to a Subcarrier Spacing (SCS) 480 kHz, and where the pre-determined time corresponds to 8 slots or fewer.

Example E14: A method includes the method of any of Examples E1 to E13. Further, the pre-determined time corresponds to a Subcarrier Spacing (SCS) 960 kHz, and where the pre-determined time corresponds to up to 16 slots or greater.

Example E15: A system includes one or more processors and computer-readable media storing instructions that, when executed by the one or more processors, cause the one or more processors to perform the method of any of Examples E1 to E14.

Example E16: A user equipment (UE) device includes one or more processors and computer-readable media storing instructions that, when executed by the one or more processors, cause the one or more processors to perform the method of any of Examples E1 to E14.

Example E17: One or more non-transitory computer-readable media stores instructions that, when executed by one or more processors, cause the one or more processors to perform the method of any of Examples E1 to E14.

Example E18: A baseband processor is configured to perform the method of any of Examples E1 to E14.

Figure 12F:
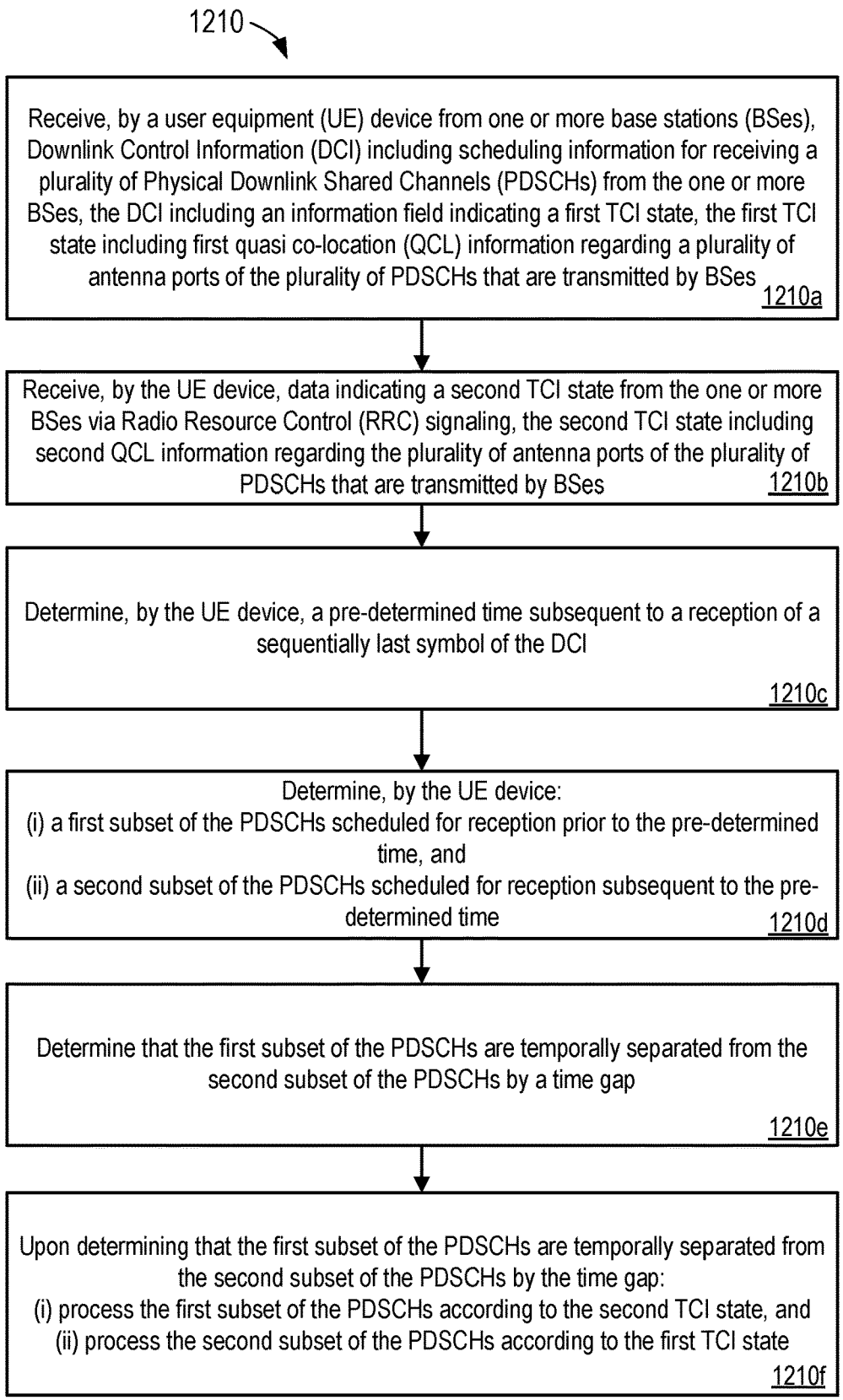

Example F1: A method includes: receiving, by a user equipment (UE) device from one or more base stations (BSes), Downlink Control Information (DCI) including scheduling information for receiving a plurality of Physical Downlink Shared Channels (PDSCHs) from the one or more BSes, the DCI including an information field indicating a first TCI state, the first TCI state including first quasi co-location (QCL) information regarding a plurality of antenna ports of the plurality of PDSCHs that are transmitted by BSes; receiving, by the UE device, data indicating a second TCI state from the one or more BSes via Radio Resource Control (RRC) signaling, the second TCI state including second QCL information regarding the plurality of antenna ports of the plurality of PDSCHs that are transmitted by BSes; determining, by the UE device, a pre-determined time subsequent to a reception of a sequentially last symbol of the DCI; determining, by the UE device: a first subset of the PDSCHs scheduled for reception prior to the pre-determined time, and a second subset of the PDSCHs scheduled for reception subsequent to the pre-determined time; determining that the first subset of the PDSCHs are temporally separated from the second subset of the PDSCHs by a time gap; and upon determining that the first subset of the PDSCHs are temporally separated from the second subset of the PDSCHs by the time gap: processing the first subset of the PDSCHs according to the second TCI state, and processing the second subset of the PDSCHs according to the first TCI state. A flow chart diagram representing Example F1 is shown in FIG. 12F.

Example F2: A method includes the method of Example F1. Further, processing the first subset of the PDSCHs according to the second TCI state includes: processing Down Link (DL) Reference Signals (RS) of the first subset of the PDSCHs according to at least one of: a common Doppler shift parameter, a common a Doppler spread parameter, a common average delay parameter, a common delay spread parameter ports, or a common spatial receiving parameter.

Example F3: A method includes the method of any of Examples F1 and F2. Further, processing the second subset of the PDSCHs according to the first TCI state includes: processing Down Link (DL) Reference Signals (RS) of the second subset of the PDSCHs according to at least one of: a common Doppler shift parameter, a common a Doppler spread parameter, a common average delay parameter, a common delay spread parameter ports, or a common spatial receiving parameter.

Example F4: A method includes the method of any of Examples F1 to F3. Further, the pre-determined time corresponds to a minimum length of time between the reception of the sequentially last symbol of the DCI and application of QCL information received the DCI for processing PDSCHs.

Example F5: A method includes the method of any of Examples F1 to F4. Further, the pre-determined time corresponds to a Subcarrier Spacing (SCS) 120 kHz, and where the pre-determined time interval corresponds to one or two slots.

Example F6: A method includes the method of any of Examples F1 to F5. Further, the pre-determined time corresponds to a Subcarrier Spacing (SCS) 480 kHz, and where the pre-determined time interval corresponds to 8 slots or fewer.

Example F7: A method includes the method of any of Examples F1 to F6. Further, the pre-determined time corresponds to a Subcarrier Spacing (SC S) 960 kHz, and where the pre-determined time interval corresponds to up to 16 slots or greater.

Example F8: A system includes one or more processors and computer-readable media storing instructions that, when executed by the one or more processors, cause the one or more processors to perform the method of any of Examples F1 to F7.

Example F9: A user equipment (UE) device includes one or more processors and computer-readable media storing instructions that, when executed by the one or more processors, cause the one or more processors to perform the method of any of Examples F1 to F7.

Example F10: One or more non-transitory computer-readable media stores instructions that, when executed by one or more processors, cause the one or more processors to perform the method of any of Examples F1 to F7.

Example F11: A baseband processor is configured to perform the method of any of Examples F1 to F7.

Figure 12G:
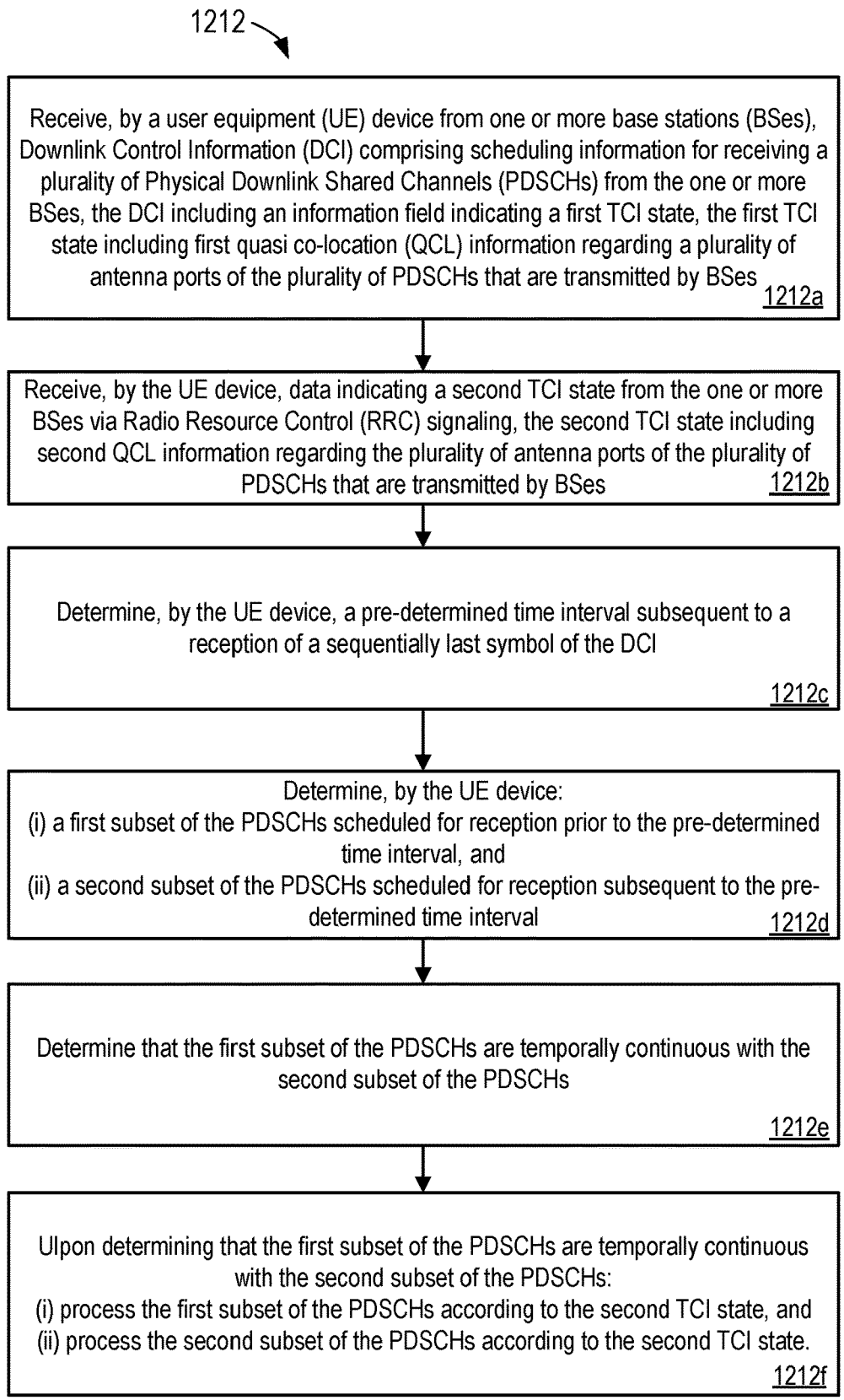

Example G1: A method includes: receiving, by a user equipment (UE) device from one or more base stations (BSes), Downlink Control Information (DCI) including scheduling information for receiving a plurality of Physical Downlink Shared Channels (PDSCHs) from the one or more BSes, the DCI including an information field indicating a first TCI state, the first TCI state including first quasi co-location (QCL) information regarding a plurality of antenna ports of the plurality of PDSCHs that are transmitted by BSes; receiving, by the UE device, data indicating a second TCI state from the one or more BSes via Radio Resource Control (RRC) signaling, the second TCI state including second QCL information regarding the plurality of antenna ports of the plurality of PDSCHs that are transmitted by BSes; determining, by the UE device, a pre-determined time interval subsequent to a reception of a sequentially last symbol of the DCI; determining, by the UE device: a first subset of the PDSCHs scheduled for reception prior to the pre-determined time interval, and a second subset of the PDSCHs scheduled for reception subsequent to the pre-determined time interval; determining that the first subset of the PDSCHs are temporally continuous with the second subset of the PDSCHs; and upon determining that the first subset of the PDSCHs are temporally continuous with the second subset of the PDSCHs: processing the first subset of the PDSCHs according to the second TCI state, and processing the second subset of the PDSCHs according to the second TCI state. A flow chart diagram representing Example G1 is shown in FIG. 12G.

Example G2: A method includes the method of Example G1. Further, processing the first subset of the PDSCHs according to the second TCI state includes: processing Down Link (DL) Reference Signals (RS) of the first subset of the PDSCHs according at least one of: a common Doppler shift parameter, a common a Doppler spread parameter, a common average delay parameter, a common delay spread parameter ports, or a common spatial receiving parameter.

Example G3: A method includes the method of any of Examples G1 and G2. Further, processing the second subset of the PDSCHs according to the second TCI state includes: processing Down Link (DL) Reference Signals (RS) of the second subset of the PDSCHs according at least one of: a common Doppler shift parameter, a common a Doppler spread parameter, a common average delay parameter, a common delay spread parameter ports, or a common spatial receiving parameter.

Example G4: A method includes the method of any of Examples G1 to G3. Further, the pre-determined time corresponds to a minimum length of time between the reception of the sequentially last symbol o of the DCI and application of QCL information received the DCI for processing PDSCHs.

Example G5: A method includes the method of any of Examples G1 to G4. Further, the pre-determined time corresponds to a Subcarrier Spacing (SCS) 120 kHz, and where the pre-determined time interval corresponds to one or two slots.

Example G6: A method includes the method of any of Examples G1 to G5. Further, the pre-determined time corresponds to a Subcarrier Spacing (SCS) 480 kHz, and where the pre-determined time interval corresponds to 8 slots or fewer.

Example G7: A method includes the method of any of Examples G1 to G6. Further, the pre-determined time corresponds to a Subcarrier Spacing (SCS) 960 kHz, and where the pre-determined time interval corresponds to up to 16 slots or greater.

Example G8: A system includes one or more processors and computer-readable media storing instructions that, when executed by the one or more processors, cause the one or more processors to perform the method of any of Examples G1 to G7.

Example G9: A user equipment (UE) device includes one or more processors and computer-readable media storing instructions that, when executed by the one or more processors, cause the one or more processors to perform the method of any of the Examples G1 to G7.

Example G10: One or more non-transitory computer-readable media stores instructions that, when executed by one or more processors, cause the one or more processors to perform the method of any of Examples G1 to G7.

Example G10: A baseband processor is configured to perform the method of any of Examples G1 to G7.

Example H1: A method includes: receiving, by a user equipment (UE) device, a slot of data transmitted by a base station (BS), where the slot of data includes a sequence of symbols, and where the slot of data includes: a first Synchronization Signal Block (SSB) includes a first subset of the symbol, and a second SSB subsequent to the first SSB, the second SSB includes a second subset of the symbols; determining, by the UE device, a quality of a wireless channel between the BS to the UE device, where determining the quality of the wireless channel includes at least one of: determining a first quality metric for a first interval extending from a sequentially first symbol of the slot of data to a symbol immediately preceding the first subset of symbols, determining a second quality metric for a second interval extending from the sequentially first symbol of the slot of data to a sequentially last symbol of the first subset of symbols, determining a third quality metric for a third interval extending from the sequentially first symbol of the slot of data to a symbol immediately preceding the second subset of symbols, or determining a fourth quality metric for a fourth interval extending from the sequentially first symbol of the slot of data to a sequentially last symbol of the second subset of symbols; and transmitting, by the UE device, an indication of the quality of the wireless channel to the BS. A flow chart diagram representing Example H1 is shown in FIG. 12H.

Example H2: A method includes the method of Example H1. Further, the quality of the wireless channel represents a Received Signal Strength Indication (RSSI) of the wireless channel.

Example H3: A method includes the method of any of Examples H1 and G2. Further, the first quality metric represents a Received Signal Strength Indication (RSSI) of the wireless channel during the first interval.

Example H4: A method includes the method of any of Examples H1 to H3. Further, the second quality metric represents a Received Signal Strength Indication (RSSI) of the wireless channel during the second interval.

Example H5: A method includes the method of any of Examples H1 to H4. Further, the third quality metric represents a Received Signal Strength Indication (RSSI) of the wireless channel during the third interval.

Example H6: A method includes the method of any of Examples H1 to H5. Further, the fourth quality metric represents a Received Signal Strength Indication (RSSI) of the wireless channel during the fourth interval.

Example H7: A method includes the method of any of Examples H1 to H6. Further, the method includes: receiving, by the UE device, configuration data from the BS via Radio Resource Control (RRC) signaling, where the configuration data specifies that the quality of the wireless channel be determined by performing one or more of: determining the first quality metric for the first interval, determining the second quality metric for the second interval, determining the third quality metric for the third interval, or determining the fourth quality metric for the fourth interval; and upon receiving the configuration data, determining the quality of the wireless channel in accordance with the configuration data.

Example H8: A method includes the method of any of Examples H1 to H7. Further, the first SSB has exactly 4 symbols, and where the second SSB has exactly 4 symbols.

Example H9: A method includes the method of any of Examples H1 to H8. Further, the slot of data has exactly 14 symbols.

Example H10: A method includes the method of any of Examples H1 to H9. Further, the first interval has exactly 2 symbols.

Example H11: A method includes the method of any of Examples H1 to H10. Further, the second interval has exactly 6 symbols.

Example H12: A method includes the method of any of Examples H1 to H11. Further, the third interval has exactly 9 symbols.

Example H13: A method includes the method of any of Examples H1 to H12. Further, the fourth interval has exactly 13 symbols.

Example H14: A system includes one or more processors and computer-readable media storing instructions that, when executed by the one or more processors, cause the one or more processors to perform the method of any of Examples H1 to H13.

Example H15: A user equipment (UE) device includes one or more processors and computer-readable media storing instructions that, when executed by the one or more processors, cause the one or more processors to perform the method of any of Examples H1 to H13.

Example H16: One or more non-transitory computer-readable media stores instructions that, when executed by one or more processors, cause the one or more processors to perform the method of any of Examples H1 to H13.

Example H16: A baseband processor is configured to perform the method of any of Examples H1 to H13.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A user equipment (UE) device comprising:
one or more processors; and
computer-readable media storing instructions that, when executed by the one or more processors, cause the one or more processors to perform operations comprising:
receiving a plurality of Synchronization Signal Block (SSB) beams transmitted by one or more base stations (BSes) during one or more discovery burst transmission windows (DBTWs);
for each of the SSB beams:
determining an index value of the SSB beam ($l_{SSB}$) within a respective one of the DBTWs, and
determining a value $Z=l_{SSB}$ mod $N_{SSB}^{QCL}$, wherein $N_{SSB}^{QCL}$ represents a maximum allowable number of SSB beams transmitted by each of the BSes during a single DBTW;
determining whether two or more of the SSB beams are quasi co-located based on the values Z for the SSB beams; and
processing wireless signals received from the one or more BSes based on the determination whether two or more of the SSB beams are quasi co-located.

2. The UE device of claim 1, wherein determining whether two or more of the SSB beams are quasi co-located comprises:
determining that the value Z for a first SSB beam from among the plurality of SSB beams is equal to the value Z for a second SSB beam from among the plurality of SSB beams, and
determining that the first SSB beam and the second SSB beams are quasi co-located based the determination that the value Z for the first SSB beam is equal to the value Z for the second SSB beam.

3. The UE device of claim 1, wherein determining whether two or more of the SSB beams are quasi co-located comprises:
determining that the value Z for a first SSB beam from among the plurality of SSB beams is not equal to the value Z for a second SSB beam from among the plurality of SSB beams, and
determining that the first SSB beam and the second SSB beams are not quasi co-located based the determination that the value Z for the first SSB beam is not equal to the value Z for the second SSB beam.

4. The UE device of claim 1, wherein a value of $N_{SSB}^{QCL}$ is selected from a set consisting of 16, 32, and 64.

5. The UE device of claim 1, the operations further comprising:
determining a value of $N_{SSB}^{QCL}$ based on a master information block (MIB) transmitted from one or more BSes to a user equipment (UE) device.

6. The UE device of claim 1, wherein processing the wireless signals received from the one or more BSes comprises:
upon determining that the two or more of the SSB beams are quasi co-located, demodulating the wireless signals according to at least one of:
a common Doppler shift parameter,
a common a Doppler spread parameter,
a common average delay parameter,
a common delay spread parameter ports, or
a common spatial receiving parameter.

7. A baseband processor configured to perform operations comprising:
receiving, by a user equipment (UE) device, a plurality of Synchronization Signal Block (SSB) beams transmitted by one or more base stations (BSes) during one or more discovery burst transmission windows (DBTWs);
for each of the SSB beams:
determining, by the UE device, an index value of the SSB beam ($l_{SSB}$) within a respective one of the DBTWs, and
determining, by the UE device, a value $Z=l_{SSB}$ mod $N_{SSB}^{QCL}$, wherein $N_{SSB}^{QCL}$ represents a maximum allowable number of SSB beams transmitted by each of the BSes during a single DBTW;
determining, by the UE, whether two or more of the SSB beams are quasi co-located based on the values Z for the SSB beams; and
processing, by the UE device, wireless signals received from the one or more BSes based on the determination whether two or more of the SSB beams are quasi co-located.

8. The baseband processor of claim 7, wherein determining whether two or more of the SSB beams are quasi co-located comprises:
determining that the value Z for a first SSB beam from among the plurality of SSB beams is equal to the value Z for a second SSB beam from among the plurality of SSB beams, and
determining that the first SSB beam and the second SSB beams are quasi co-located based the determination that the value Z for the first SSB beam is equal to the value Z for the second SSB beam.

9. The baseband processor of claim 7, wherein determining whether two or more of the SSB beams are quasi co-located comprises:
determining that the value Z for a first SSB beam from among the plurality of SSB beams is not equal to the value Z for a second SSB beam from among the plurality of SSB beams, and determining that the first SSB beam and the second SSB beams are not quasi co-located based the determination that the value Z for the first SSB beam is not equal to the value Z for the second SSB beam.

10. The baseband processor of claim 7, wherein a value of $N_{SSB}^{QCL}$ is selected from a set consisting of 16, 32, and 64.

11. The baseband processor of claim 7, the operations further comprising:

determining a value of $N_{SSB}^{QCL}$ based on a master information block (MIB) transmitted from one or more BSes to the UE device.

12. The baseband processor of claim 7, wherein processing the wireless signals received from the one or more BSes comprises:

upon determining that the two or more of the SSB beams are quasi co-located, demodulating the wireless signals according to at least one of:
a common Doppler shift parameter,
a common a Doppler spread parameter,
a common average delay parameter,
a common delay spread parameter ports, or
a common spatial receiving parameter.

13. A method comprising:

receiving, by a user equipment (UE) device, a plurality of Synchronization Signal Block (SSB) beams transmitted by one or more base stations (BSes) during one or more discovery burst transmission windows (DBTWs);

for each of the SSB beams:
determining, by the UE device, an index value of the SSB beam ($l_{SSB}$) within a respective one of the DBTWs, and
determining, by the UE device, a value $Z = l_{SSB}$ mod $N_{SSB}^{QCL}$, wherein $N_{SSB}^{QCL}$ represents a maximum allowable number of SSB beams transmitted by each of the BSes during a single DBTW;

determining, by the UE, whether two or more of the SSB beams are quasi co-located based on the values Z for the SSB beams; and processing, by the UE device, wireless signals received from the one or more BSes based on the determination whether two or more of the SSB beams are quasi co-located.

14. The method of claim 13, wherein determining whether two or more of the SSB beams are quasi co-located comprises:

determining that the value Z for a first SSB beam from among the plurality of SSB beams is equal to the value Z for a second SSB beam from among the plurality of SSB beams, and determining that the first SSB beam and the second SSB beams are quasi co-located based the determination that the value Z for the first SSB beam is equal to the value Z for the second SSB beam.

15. The method of claim 13, wherein determining whether two or more of the SSB beams are quasi co-located comprises:

determining that the value Z for a first SSB beam from among the plurality of SSB beams is not equal to the value Z for a second SSB beam from among the plurality of SSB beams, and determining that the first SSB beam and the second SSB beams are not quasi co-located based the determination that the value Z for the first SSB beam is not equal to the value Z for the second SSB beam.

16. The method of claim 13, wherein a value of $N_{SSB}^{QCL}$ is selected from a set consisting of 16, 32, and 64.

17. The method of claim 13, further comprising:

determining a value of $N_{SSB}^{QCL}$ based on a master information block (MIB) transmitted from one or more BSes to the UE device.

18. The method of claim 13, wherein processing the wireless signals received from the one or more BSes comprises:

upon determining that the two or more of the SSB beams are quasi co-located, demodulating the wireless signals according to at least one of:
a common Doppler shift parameter,
a common a Doppler spread parameter,
a common average delay parameter,
a common delay spread parameter ports, or
a common spatial receiving parameter.

* * * * *

UNITED STATES PATENT AND TRADEMARK OFFICE
CERTIFICATE OF CORRECTION

PATENT NO. : 12,414,144 B2  
APPLICATION NO. : 17/947847  
DATED : September 9, 2025  
INVENTOR(S) : Hong He et al.

Page 1 of 1

It is certified that error appears in the above-identified patent and that said Letters Patent is hereby corrected as shown below:

On the Title Page

Column 2 Item (57) (Abstract), Line 7, Delete "$N_{SSD}^{QCL}$," and insert -- $N_{SSB}^{QCL}$, --.

Signed and Sealed this  
Ninth Day of December, 2025

John A. Squires  
*Director of the United States Patent and Trademark Office*